United States Patent [19]
Takenaka et al.

[11] Patent Number: 5,585,805
[45] Date of Patent: Dec. 17, 1996

[54] TRAVEL VELOCITY DETECTING APPARATUS IN MOBILE COMMUNICATION SYSTEM

[75] Inventors: Tetsuyoshi Takenaka, Asaka; Yoshiharu Tajima; Kazuo Kawabata, both of Kawasaki, all of Japan

[73] Assignee: Fujitsu Limited, Kawasaki, Japan

[21] Appl. No.: 325,207

[22] PCT Filed: Nov. 24, 1993

[86] PCT No.: PCT/JP93/01714

§ 371 Date: Feb. 9, 1995

§ 102(e) Date: Feb. 9, 1995

[87] PCT Pub. No.: WO94/19704

PCT Pub. Date: Sep. 1, 1994

[30] Foreign Application Priority Data

Feb. 26, 1993 [JP] Japan .................... 5-037155
May 20, 1993 [JP] Japan .................... 5-118032
May 20, 1993 [JP] Japan .................... 5-118033

[51] Int. Cl.$^6$ .................................................. G01S 3/02
[52] U.S. Cl. .................................................. 342/461
[58] Field of Search .............................. 342/461, 115, 342/117, 357; 379/59

[56] References Cited

U.S. PATENT DOCUMENTS 2,083,945  6/1937  Evans ........................ 342/461
5,396,253  3/1995  Chia ......................... 342/104

FOREIGN PATENT DOCUMENTS 55-21607    2/1980   Japan .
59-20207    5/1984   Japan .
60-52129    3/1985   Japan .
64-21543    2/1989   Japan .
2-244917    9/1990   Japan .
3-83423     4/1991   Japan .
3-28099     4/1991   Japan .
3-28100     4/1991   Japan .
3-104330    5/1991   Japan .

*Primary Examiner*—Gregory C. Issing
*Attorney, Agent, or Firm*—Staas & Halsey

[57] ABSTRACT

A travel velocity detector is installed in a mobile telephone station such as a portable telephone or a car telephone. The travel velocity detector adapts a received power level to a travel velocity of the mobile station. Two receiving circuits receive communication waves via respective antennas and output respective power levels E1 and E2 therefrom. The detected powers E1 and E2 are compared with each other to determine which of the powers is greater. A variation of the comparison result is then detected. The number of detected variations, corresponding to a switching frequency, is then counted during a preset time period. A relative travel velocity between the mobile station and an opposite transmitting station is estimated on the basis of the number of the counted variations.

24 Claims, 29 Drawing Sheets

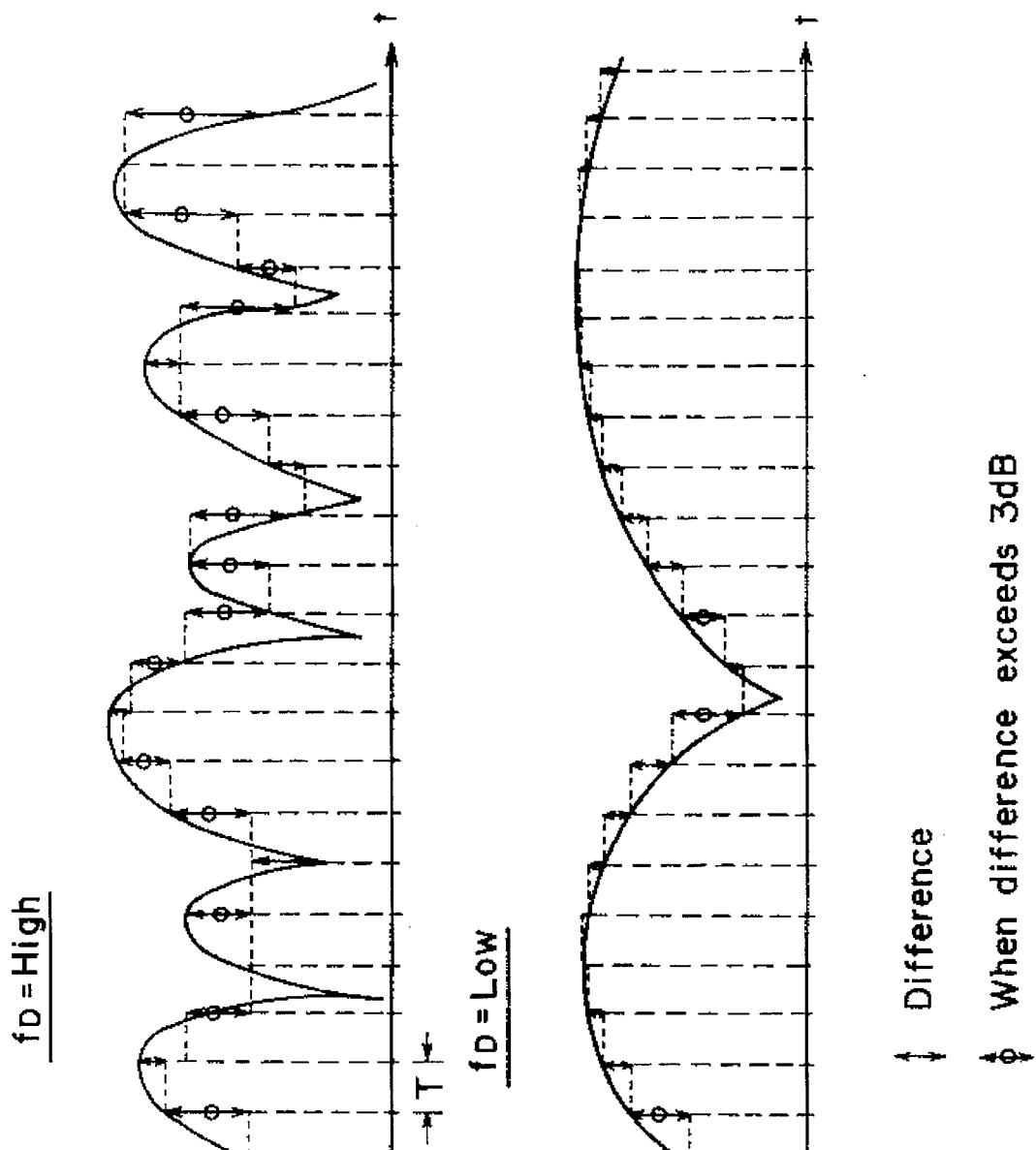

TRAVEL VELOCITY DETECTING APPARATUS IN MOBILE COMMUNICATION SYSTEM

TECHNICAL FIELD

The present invention generally relates to an apparatus installed in a mobile station, such as a portable telephone, or a car telephone and serving to detect a travel velocity of such a mobile station from radio communication waves. More particularly, the present invention relates to a travel velocity detecting apparatus which is employed in a mobile communication system to adapt a received power level to the travel velocity of the mobile station while further detecting the acceleration and travel distance of the mobile station.

BACKGROUND ART

It is observed of late that the demand for the above-described mobile station is on a remarkable upward trend, and therefore other apparatus and devices ancillary to the mobile communication system are also extended in compliance with such increasing requirements. Under the current circumstances where the whole mobile communication system is in an enhanced state of progress, it becomes necessary to use many radio frequencies for communication.

However, there exist limits in the usable radio frequencies. For the purpose of achieving effective utilization of radio frequencies, introduction of some novel techniques is now being studied, including dynamic channel allocation control and so forth. In such dynamic channel allocation control, it is pointed out that data relative to the travel velocity of a caller is rendered important. Consequently the travel velocity of a caller, i.e., the velocity of a mobile station, needs to be detected.

Although detection of the travel velocity of a mobile station is important, as in this example, an adequate apparatus designed for detecting the travel velocity of a mobile station from radio communication waves, as mentioned above in the "Technical Field", has not been available in the prior art. The travel velocity of a mobile station is usable also as an essential parameter in radio circuit control such as "hand-off" control executed when a mobile station runs in a radio zone. In addition, it has recently become known that the travel distance and the acceleration of a mobile station are also considered to be important parameters. However, a conventional apparatus is not available for acquiring the travel distance and the acceleration from radio communication waves.

By the way, there is observed in the field of mobile communication, a phenomenon termed "fading" wherein the received power level is sharply varied. Even under such circumstances, it is necessary to perform a precise decision of the present radio zone and an accurate detection of the received power level which is required for controlling the transmission power. The temporal variation pitch of the received power level caused by such fading is proportional to the travel velocity of the mobile station.

In detecting the received power level, generally, a temporal averaging process is executed. Since averaging time is determined by the variation pitch, a short time is sufficient for rapid variations, but a long averaging time is needed for slow and gentle variations. For example, the variation pitch is shortened in accordance with an increase of the velocity of the mobile station, so that the number of variation samples extracted per unit time for the averaging process is rendered greater. More specifically, in the case of rapid variations, the required averaging time is short as mentioned.

Meanwhile if the velocity of the mobile station is lowered, the variation pitch is rendered longer to consequently reduce the number of samples extracted per unit time for the averaging process. That is, in slow and gentle variations, the required averaging time is prolonged. For this reason, another problem has been existent in the prior art heretofore that, even when a short averaging time is sufficient to execute the process, a long averaging time is required in conformity with the case where the necessary averaging time is long.

SUMMARY OF THE INVENTION

It is therefore an object of the present invention to provide a travel velocity detecting apparatus which is employed in a mobile communication system for solution of the above-described problems observed in the prior art and is capable of detecting the travel velocity, travel distance and acceleration of a mobile station from radio communication waves without the necessity of referring to the velocity data of a mobile body itself, such as a car.

Another object of the present invention resides in providing a travel velocity detecting apparatus which is capable of adapting, in a mobile communication system, a received power level to the travel velocity of a mobile station.

According to a first principle of the present invention, there is provided a travel velocity detecting apparatus in a mobile communication system, which comprises receiving means of two or more channels capable of receiving radio waves and detecting the powers thereof; comparator means connected operatively to the receiving means of two or more channels for mutually comparing the powers detected by the receiving means of two or more channels so as to determine the greater power; variation detector means connected operatively to the comparator means for detecting the variations of the comparison result outputted from the comparator means; counter means connected operatively to the variation detector means for counting the number of the detected variations for a preset time; and converter means connected operatively to the counter means for calculating the relative travel velocity between the relevant mobile station and the opposite station on the basis of the numerical value obtained by the counting operation.

According to a second principle of the present invention, there is provided a travel velocity detector in a mobile communication system, which comprises level detector means for detecting the received power level; sampling means connected operatively to the level detector means for sampling the received power level; memory means connected operatively to the sampling means for storing the sampled power levels therein and then outputting the stored levels therefrom in the order of the storage; difference calculator means connected operatively to both the memory means and the sampling means for calculating the difference between the power levels outputted from the sampling means and the memory means; comparator means connected operatively to the difference calculator means for executing a comparison to decide whether the difference obtained by the difference calculator means has exceeded a preset threshold value or not; counter means connected operatively to the comparator means for counting the comparison results outputted from the comparator means for a predetermined time, thereby obtaining a numerical value which indicates the number of times that the difference has exceeded the preset threshold value; and converter means connected operatively to the counter means for calculating the relative travel velocity between the relevant mobile station and the opposite station on the basis of the numerical value obtained by the counter means.

BRIEF DESCRIPTION OF THE DRAWINGS

FIG. 5 shows temporal differences of the envelope when the Doppler frequency $f_D$ is high in the second principle of the invention:

FIG. 6 shows temporal differences of the envelope when the Doppler frequency $f_D$ is low in the second principle of the invention;

BEST MODE FOR CARRYING OUT THE INVENTION

Hereinafter a travel velocity detecting apparatus in a mobile communication system of the present invention will be described in detail with reference to the accompanying drawings. Referring initially to FIGS. 1 through 7, an explanation will be given of the first and second principles of the present invention.

To begin with, the first principle will be described below. In the mobile communication system, diversity is adopted to cope with fading which is caused by travel of a caller (mobile station). Out of various methods of diversity, it is generally customary to employ selective diversity due to enhanced performance. Here, the first principle will be explained with regard to an exemplary case employing post-detection selective diversity.

In a receiver where post-detection selective diversity is realized, there are provided two or more channels of mutually unrelated receiving circuits (in this example, there are two channels which are termed a first branch and a second branch). The electric field intensities of signals received by such two branches are measured independently of each other and, after selection of the greater field intensity, the signal of the greater intensity received by one of the branches (e.g., second branch) is selectively used as a reception output.

The Doppler frequency $f_D$, which serves as a parameter to characterize the fading that represents temporal variations of the received field intensity, is expressed as follows by the travel velocity v and the wavelength $\lambda$.

$$f_D = v/\lambda$$

Since the wavelength $\lambda$ is inherent in the system, its value can be regarded as a fixed wavelength here. Therefore the velocity v can be detected by finding the frequency $f_D$.

In selective diversity, the branch switching frequency is considered to be on the same order as the Doppler frequency $f_D$ which is on a variation scale of the received field intensity. Consequently, under the condition where the wavelength $\lambda$ is fixed, the branch switching frequency in the selective diversity is considered to be proportional to the travel velocity v.

Therefore it is possible to calculate the travel velocity v by measuring the branch switching frequency.

Relative to an exemplary case of incorporating two receiving branches, an explanation will now be given, with reference to FIG. 1, of the relationship between the branch switching frequency and the Doppler frequency $f_D$ (hence the travel velocity v).

Figure 1:
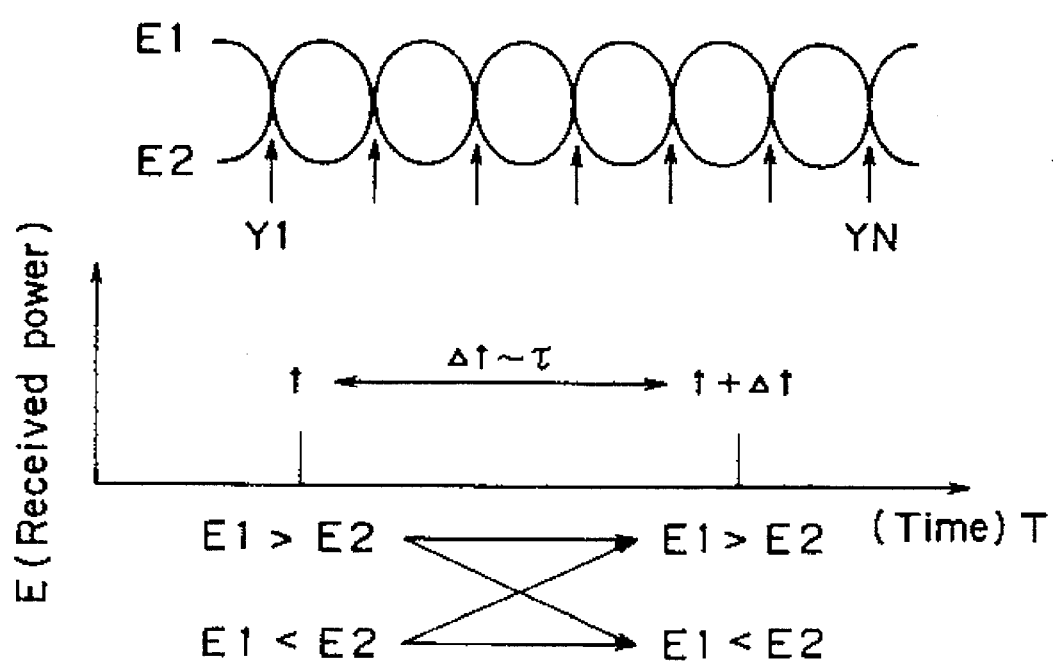
FIG. 1 is an explanatory diagram illustrating the relationship between a branch (receiving section) switching frequency and a Doppler frequency in the first principle of the present invention.

At an instant t shown in FIG. 1, there exists the following numerical relationship between the power E1(t) received by the first branch and the power E2(t) received by the second branch. However, it is supposed here that the received powers E1(t) and E2(t) are so related as represented respectively by curves E1 and E2 shown in FIG. 1, and the switching points thereof are indicated by arrows Y1–YN.

It is also supposed here that a path loss or a distance variation (long-interval median) of a received power and lognormal shadow fading (short-interval median) thereof are common to both the first and second branches, and each branch indicates an independent Rayleigh fading (momentary value).

Assuming now that each variation is in a random process, then the probability of E1(t)>E2(t) is ½, and the probability of E1(t)<E2(t) is ½.

Relative to E1 and E2 obtained at an instant t+Δt, if the value of Δt is so selected that the self-functions of E1 and E2 are rendered zero, E1(t+Δt) and E1(t) are statistically independent of each other, and also E2(t+Δt) and E2(t) are statistically independent of each other.

Further with regard to the numerical relationship between E1(t+Δt) and E2(t+Δt), the probability of E1(t+Δt)>E2(t+Δt) is ½, and the probability of E1(t+Δt)<E2(t+Δt) is ½.

Suppose here that Δt is equal to τ which is the time interval where the self function of the received wave affected by Rayleigh fading is rendered zero, i.e., the first point 0 of the class-1 Bessel function, in which $$2\pi \cdot f_D \cdot \tau = 2.4$$

$$\therefore \tau = 2.4/(2\pi \cdot f_D)$$

Then the number N of times of extracting discrete values of the received power per second is $$N \sim 1/\tau = 2\pi \cdot f_D/2.4 = 2.6 f_D$$

Therefore the number of times $N_{BC}$ of switching the first and second branches per second is expected as $$N_{BC} \sim N \cdot P_{BC} = 2.6 f_D/2 = 1.3 f_D$$

Figure 2:
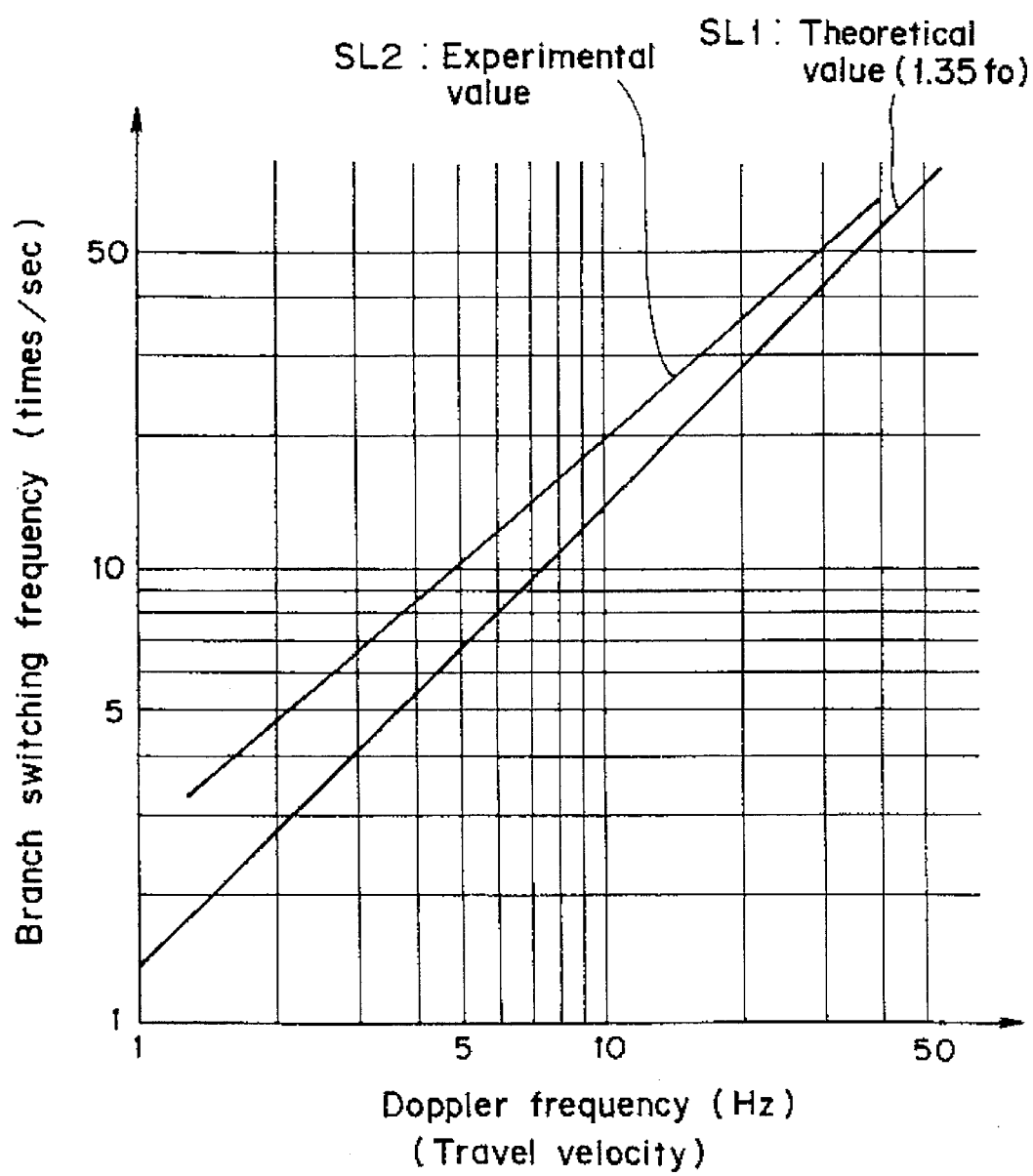
FIG. 2 graphically shows theoretical values and experimental values representing the relationship between the branch switching frequency and the Doppler frequency in the first principle of the invention.

This theoretical value $1.3 f_D$ is graphically represented by a straight line SL1 in FIG. 2. The result is based on an assumption that the correlation between the first and second branches is zero. However, even when there exists a correlation therebetween (except an instance where the correlation is completely equal to 1), it is considered that information can be acquired for estimation of the Doppler frequency $f_D$, hence estimation of the travel velocity v.

A straight line SL2 in FIG. 2 represents the experimental value obtained to ascertain the effects of the present invention by the use of a fading simulator (with hard simulation). It is obvious from this result that the branch switching frequency is approximately proportional to the Doppler frequency.

Next the second principle of the invention will be explained below. In the mobile communication system, Rayleigh fading occurs in accordance with a travel of a caller (mobile station).

As described in connection with the first principle, the Doppler frequency $f_D$ that denotes the variation speed of the Rayleigh fading is expressed as $$f_D = v/\lambda$$

Figure 3:
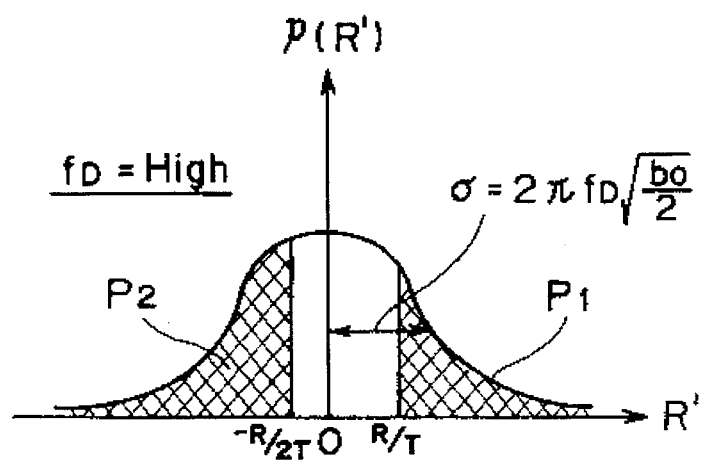
FIG. 3 shows a probability density distribution of temporal differential coefficients relative to the envelope of a received signal when the Doppler frequency $f_D$ is high in the second principle of the invention.
Figure 4:
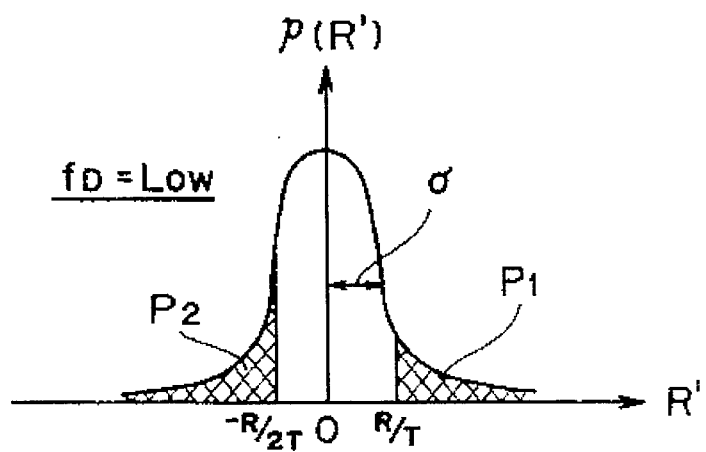
FIG. 4 shows a probability density distribution of temporal differential coefficients relative to the envelope of a received signal when the Doppler frequency $f_D$ is low in the second principle of the invention.

In the case of Rayleigh fading, a temporal differential coefficient R' relative to the envelope of a received signal conforms to a Gaussian distribution where the average value is 0, as shown in FIGS. 3 and 4.

A standard deviation $\sigma$ denoting the extension of the Gaussian distribution is expressed as follows and is proportional to the Doppler frequency $f_D$.

$$\sigma = 2\pi f_D (b_0/2)^{1/2}$$

FIG. 3 is a diagram showing a probability density distribution of temporal differential coefficients R' when the Doppler frequency $f_D$ is high, and FIG. 4 is a diagram showing a probability density distribution thereof when the Doppler frequency $f_D$ is low.

In the above, $b_0$ denotes the average power of the received signal. Therefore the extension of the probability density distribution, to which the temporal differential coefficient of the envelope conforms, is proportional to the travel velocity itself. Consequently it becomes possible to estimate the Doppler frequency $f_D$ by detecting the amount of dependency of the temporal differential coefficient on the extension of the probability density distribution, whereby the travel velocity can be estimated as well.

The amount of variation of the received power level within an extremely short time period is proportional to the temporal differential coefficient of the envelope. Therefore the amount of variation of the received power level is detected at an extremely short time interval, and a calculation is executed to find the probability that the variation amount exceeds a predetermined value. Then the probability thus obtained is equal to the probability that the temporal differential coefficient exceeds a predetermined value.

This probability is concerned with the extension of the Gaussian distribution shown in FIGS. 3 and 4. Meanwhile FIGS. 5 and 6 graphically show the temporal variations of the received power level, in which FIG. 5 represents the temporal difference of the envelope when the Doppler frequency $f_D$ is high, and FIG. 6 represents the temporal difference thereof when the Doppler frequency $f_D$ is low.

Hereinafter the characteristics of the present invention will be presumed under the condition that a count is executed every time the envelope variation exceeds 3 dB (or when the momentary power variation exceeds 6 dB). In the following description, T denotes a radio-wave sampling period, and $P_1$ and $P_2$ respectively denote the probability of an increase and that of a decrease of the envelope by 3 dB during the time period T.

$$P_1 = Prob\ [R'(t)T > R(t)]$$
$$= Prob\ [R'(t) > R(t)/T]$$
$$P_2 = Prob\ [R'(t)T < -R(t)/2]$$
$$= Prob\ [R'(t) < -R(t)/2T]$$

In the above equations, R(t) denotes the envelope at the instant t, and $R'(t)=dR(t)/dt$ denotes the temporal differential coefficient of the envelope.

A unit time (1 second) is divided by an extremely short time period T into M (=1/T) segments. During such an extremely short time period, the level fluctuation is not caused so frequently by the level variations, whereby it can be assumed that the variations are either increasing or decreasing. In this case, the number of times $N_{3dB}$ of level variations over 3 dB per unit time may be written as $$N_{3dB} = \sum_{m=0}^{M-1} [Prob\{R'(t+mT)T > R(t+mT)/T\} +$$
$$Prob[R'(t+mT)T < -R(t+mT)/2T]\}$$

Supposing now that $P_1$ and $P_2$ are equal in any time segment mT, $$N_{3dB} = M\ (P_1 + P_2)$$

Since $M=f_s$ (where $f_s$ denotes the sampling frequency), $$N_{3dB} = f_s\ (P_1 + P_2)$$

With p(R) and p(R') signifying the probability density functions of R and R' respectively, $P_1$ and $P_2$ are expressed as $$P_1 = \int_0^\infty p(R)dR \int_{R/T}^\infty p(R')dR'$$

$$P_2 = \int_0^\infty p(R)dR \int_{-R/T}^{-R/2T} p(R')dR'$$

$$[\because R(t+T) = R(t) + R'(t)T > 0]$$

Substituting the following specific equations for p(R) and p(R'):

$$p(R)=(R/b_0)\ \exp\ (-R_2/2b_0)$$

$$p(R')=1/(2\pi b_2)^{1/2}\ \exp\ (-R^2/2b_2)$$

$$b_2=(2\pi f_D)^2 b_0/2$$

then $N_{3dB}$ is modified as $$N_{3dB}=(f_s/2)\ \{1-1/[1+2(2\pi f_D/f_s)^2]^{1/2}\}$$

Figure 7:
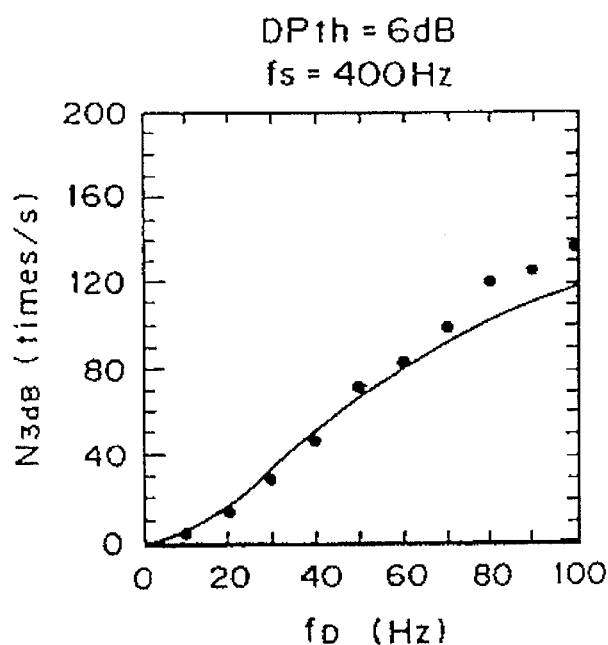
FIG. 7 graphically shows the relationship between the number $N_{3dB}$ of level variations (per second) and the Doppler frequency $f_D$ in the second principle of the invention.

Thus, it is apparent from the above that $N_{3dB}$ increases in accordance with $f_D$. It is also obvious that $N_{3dB}$ is in the form not including the average received power, which has been necessary heretofore in the prior art for measuring the number of times of level zero crossing. In FIG. 7, line segments represent theoretical values of the number $N_{3dB}$ of level variations calculated under the conditions including a maximum Doppler frequency $f_D$ of 100 Hz and a sampling frequency $f_s$ of 400 Hz, and dots represent measured values of $N_{3dB}$ obtained by computer simulation.

It is seen from the above results that the number $N_{3dB}$ of level variations is substantially proportional to the Doppler frequency $f_D$.

Hereinafter preferred embodiments of the present invention based on the aforementioned first and second principles will be described with reference to the accompanying drawings.

Figure 8:
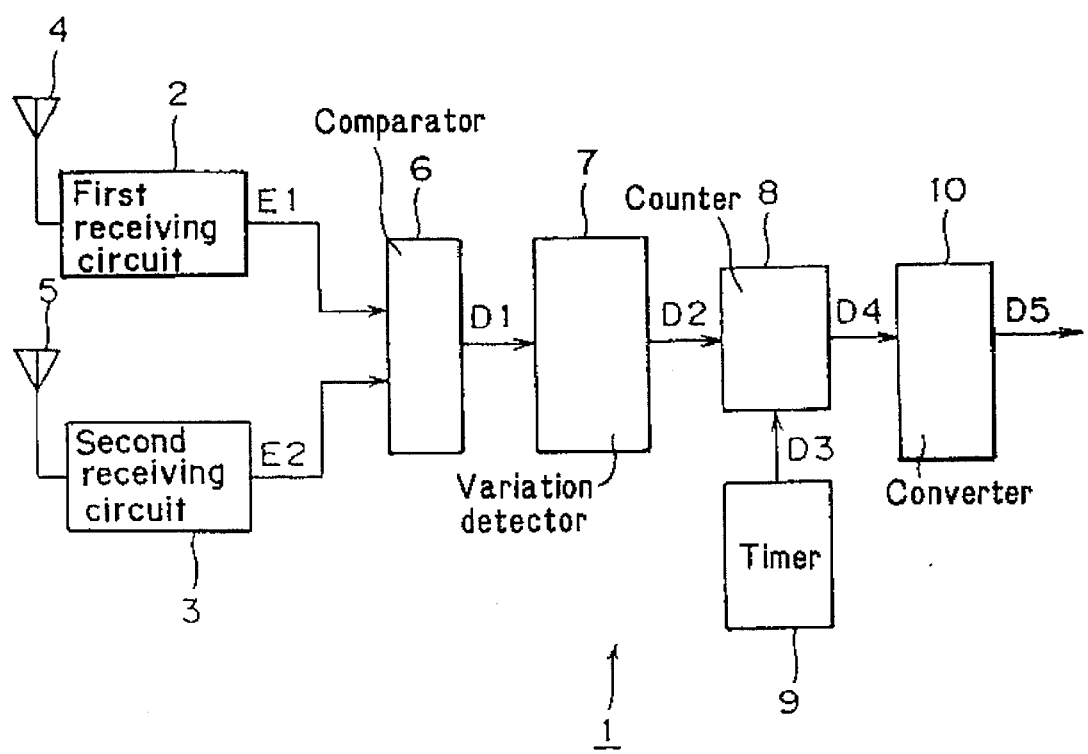
FIG. 8 is a block diagram of a travel velocity detecting apparatus in a mobile communication system according to a 1st embodiment of the invention.

FIG. 8 is a block diagram of a travel velocity detecting apparatus in a mobile communication system according to a 1st embodiment of the present invention.

The travel velocity detecting apparatus 1 shown in FIG. 8 is installed in a mobile station or a base station (stationary station) of a car telephone or a portable telephone in a mobile communication system. In the relevant station (e.g., mobile station) where the travel velocity detecting apparatus 1 is installed, the relative travel velocity to the opposite station (e.g., base station) is calculated on the basis of radio waves received by the relevant station.

The travel velocity detecting apparatus 1 is equipped with two receiving branches of mutually unrelated channels, wherein there are included a first receiving circuit 2 of one receiving branch, and a second receiving circuit 3 of the other receiving branch. Such two receiving circuits 2, 3 detect radio communication waves received by antennas 4, 5 respectively and, after detection of the received powers, deliver output power values E1, E2 therefrom.

Reference numeral 6 denotes a comparator circuit which compares the power values E1 and E2 with each other and outputs comparison data D1 of "1" when E1>E2 or outputs comparison data D1 of "0" when E1<E2. Meanwhile when E1=E2, the circuit 6 outputs the preceding comparison data D1.

Reference numeral 7 denotes a variation detector circuit which produces merely a single pulse signal D2 in response to a change of the comparison data D1 from "0" to "1" or from "1" to "0".

Denoted by 8 and 9 are a counter and a timer, respectively. The timer 9 produces an enable signal D3, which places the counter 8 in an operable state only for a predetermined time (e.g., 1 second), at a preset or random interval during communication. When a pulse signal D2 is inputted to the counter 8 during supply of an enable signal D3, the counter 8 performs one counting operation in response to each input pulse and then outputs a count value D4. However, the counter 8 is reset to 0 when an enable signal D3 is supplied thereto.

Reference numeral 10 denotes a converter circuit. This circuit 10 has a table which is composed of count values 0, 1, 2, . . . , N and travel velocity data assigned correspondingly to such count values. When a count value D4 is inputted, the converter circuit 10 retrieves travel velocity data D5 corresponding to the count value D4 and then outputs the retrieved data. The count value D4 corresponds to the receiving-circuit switching number (branch switching frequency) described in connection with the first principle, and the travel velocity data assigned correspondingly to the count values are calculated theoretically according to the first principle or are acquired experimentally.

The conversion by the converter circuit 10 may be executed in compliance with a program which represents a conversion equation $v=(N_{BC}/1.3)\cdot\lambda$ based on the theory described in connection with the first principle or another conversion equation $v=(N_{BC}/2.6)^{1.2}\cdot\lambda$ based on the experiment.

The above conversion equation $v=(N_{BC}/2.6)^{1.2}\cdot\lambda$ based on the experiment was obtained as follows.

Calculating the relationship between the branch switching frequency $N_{BC}$ and the Doppler frequency $f_D$ on the basis of the experimental value SL2 shown in FIG. 2, $$N_{BC}=10^{0.42} \cdot f_D^{0.85} \approx 2.6 f_D^{0.85}$$

Therefore, $$f_D=(N_{BC}/2.6)^{1/0.85}=v/\lambda$$

$$\therefore v=(N_{BC}/2.6)^{1/0.85}\cdot\lambda \approx (n_{BC}/2.6)^{1.2}\cdot\lambda$$

According to the travel velocity detecting apparatus 1 of the construction mentioned above, first the power values E1, E2 of the received radio waves are detected by the first and second receiving circuits 2, 3, and the power values E1 and E2 are compared with other by the comparator circuit 6. The data D1 representing the result of such comparison, e.g., "1010010110101 . . .", is inputted to the variation detector circuit 7 where the variation point is detected. More specifically, the number of times of switching the receiving circuits 2 and 3 is obtained.

Pulse signals D2 equal in number to the variation points are outputted from the variation detector circuit 7 and then are counted by the counter 8. If the timer 9 is so preset as to output an enable signal D3 only for 1 second, the counter 8 performs its counting operations by the number equal to the pulse signals D2 supplied thereto during 1 second, and a count value D4 obtained as a result of such counting operations, i.e., the number of times of switching the receiving circuits 2 and 3, is outputted to the converter circuit 10.

And finally in the converter circuit 10, the travel velocity data D5 corresponding to the count value D4 is retrieved and outputted.

According to the travel velocity detecting apparatus 1 of the 1st embodiment described above, it is possible to detect the travel velocity of the mobile station from the received radio communication waves. And such a capability can be realized by a small-scale circuit configuration, which is applicable to both a mobile station and a base station.

Next a travel velocity detecting apparatus 11 of a 2nd embodiment will be described below with reference to FIG. 9. In the 2nd embodiment shown in FIG. 9, like component circuits corresponding to those used in the 1st embodiment are denoted by like reference numerals, and an explanation thereof is omitted here.

Figure 9:
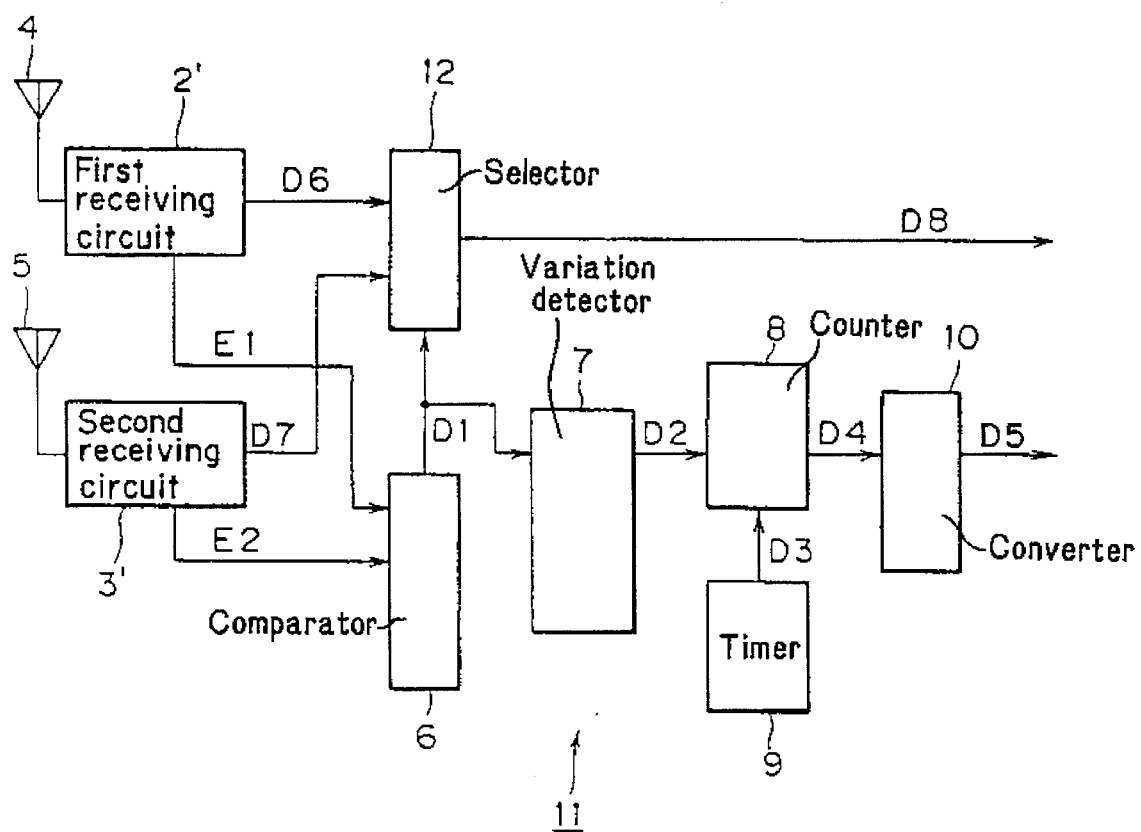
FIG. 9 is a block diagram of a travel velocity detecting apparatus in a mobile communication system according to a 2nd embodiment of the invention.

The travel velocity detecting apparatus 11 of the 2nd embodiment shown in FIG. 9 is constructed on the basis of a function to perform a post-detection synthetic diversity and comprises the circuits 2 to 10 employed in the 1st embodiment of FIG. 8.

The structural difference from the 1st embodiment resides in that one of received data D6, D7 obtained by first and second receiving circuits 2', 3' (diversity branches) is selected in response to comparison data D1, and the data thus selected is outputted as received data D8 which is delivered to an unshown telephone earpiece.

In this travel velocity detecting apparatus 11 of the 2nd embodiment also, it is possible to achieve the same effects as those in the aforementioned 1st embodiment.

Now a travel velocity detecting apparatus 14 of a 3rd embodiment will be described with reference to FIG. 10. In the 3rd embodiment of FIG. 10, like component circuits corresponding to those employed in the 1st embodiment of FIG. 8 are denoted by like reference numerals, and an explanation thereof is omitted here.

Figure 10:
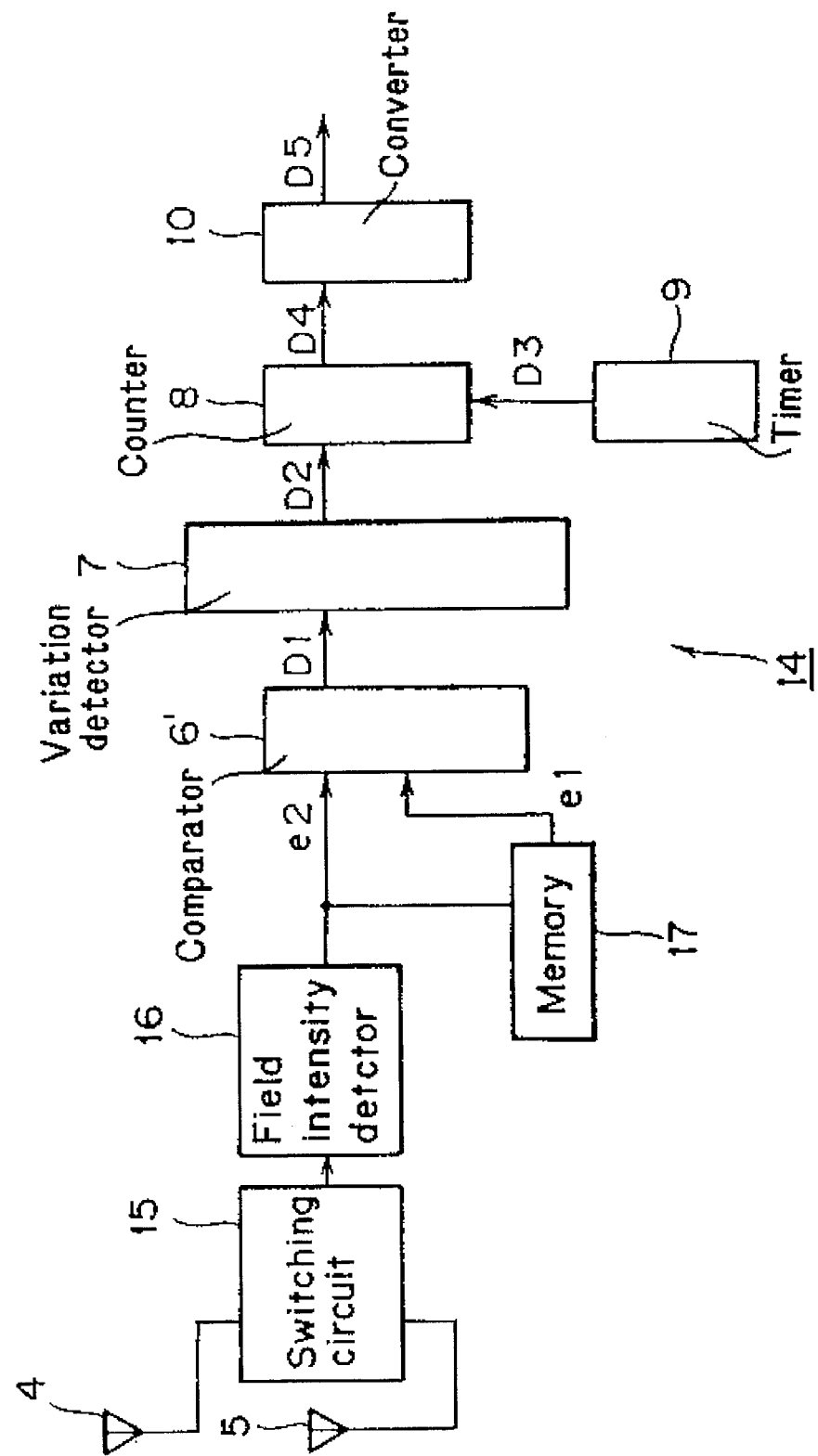
FIG. 10 is a block diagram of a travel velocity detecting apparatus in a mobile communication system according to a 3rd embodiment of the invention.

The travel velocity detecting apparatus 14 of the 3rd embodiment shown in FIG. 10 is constructed on the basis of a function to perform an antenna switching diversity, wherein electric field intensities of radio waves received respectively by antennas 4 and 5 of two channels are measured within a short time, then the field intensities are compared with each other to count the number of times of switching the receiving branches, and travel velocity data D5 is detected in accordance with the count value thus obtained.

First the antennas 4 and 5 are switched at a short time interval by a switching circuit 15 so that input radio waves to the antennas 4 and 5 are alternately received.

Then the field intensities e1 and e2 of the radio waves alternately received are detected by a field intensity detector circuit 16 and are outputted therefrom. It is supposed here that the field intensity e1 signifies the radio waves received by the antenna 4, while the field intensity e2 signifies the radio waves received by the antenna 5. It is further supposed that the radio waves received by the antenna 4 are detected first.

In a memory 17, the values of merely the field intensity e1 are stored successively and then are outputted therefrom in the order of such storage. The field intensity e1 outputted from the memory 17 and the field intensity e2 obtained by subsequent switching of the antennas are compared with each other by a comparator circuit 6' in a next stage.

Comparison data D1 of "1" is outputted when the result of such comparison is e1>e2, or comparison data of "0" is outputted when the result is e1<e2. Meanwhile, when e1=e2, the preceding comparison data D1 is outputted.

Thereafter the same process as that described in connection with the 1st embodiment is executed in the circuits posterior to the variation detector circuit 7, and finally travel velocity data D5 is obtained. Consequently in the travel velocity detecting apparatus 14 of the 3rd embodiment also, it is possible to achieve the same effects as in the aforementioned 1st embodiment.

Next a travel velocity detecting apparatus 19 of a 4th embodiment will be described below with reference to FIG. 11. In the 4th embodiment shown in FIG. 19, like component circuits corresponding to those employed in the 1st embodiment of FIG. 8 are denoted by like reference numerals, and an explanation thereof is omitted here.

Figure 11:
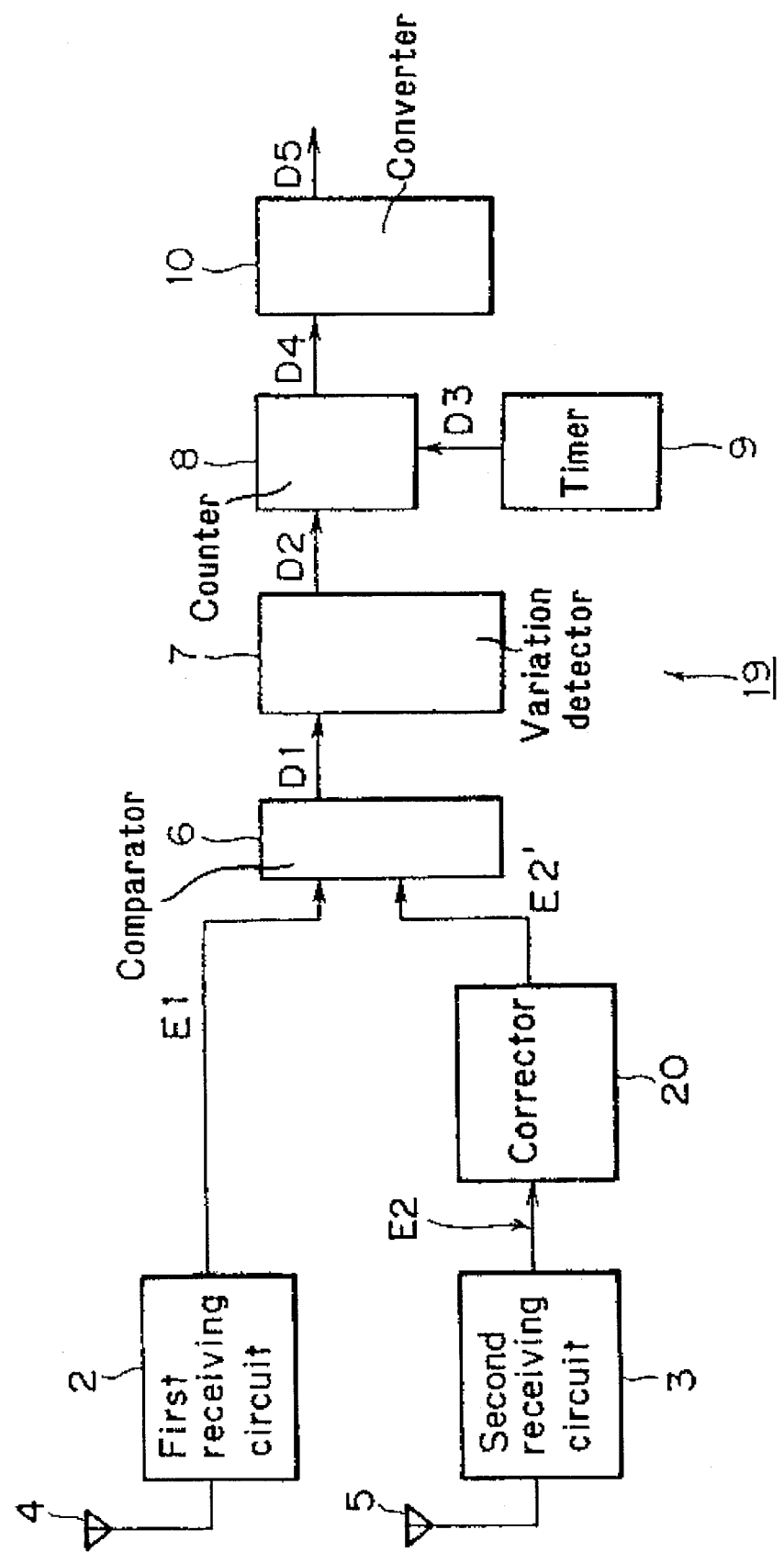
FIG. 11 is a block diagram of a travel velocity detecting apparatus in a mobile communication system according to a 4th embodiment of the invention.

The travel velocity detecting apparatus 1 of the 4th embodiment shown in FIG. 11 is different from the 1st embodiment in the point that a corrector circuit 20 is provided in a stage posterior to the second receiving circuit 3 so as to detect and correct any gain difference existing between the first and second receiving circuits 2 and 3. However, the corrector circuit 20 may be provided posterior to the first receiving circuit 2 as well.

Such correction of the gain difference is performed for the reason that a proper comparison is not attainable if the power values E1 and E2 having any gain difference therebetween are compared with each other by the comparator circuit 6 without a correction.

According to the 4th embodiment, the aforementioned effects in the 1st embodiment can be similarly achieved, and another advantage can be ensured that, despite the existence of any gain difference between the two receiving branches, proper travel velocity data D5 is exactly obtainable by correcting such gain difference.

Next a travel velocity detecting apparatus 22 of a 5th embodiment will be described below with reference to FIG. 12. In the 5th embodiment shown in FIG. 12, like component circuits corresponding to those employed in the 1st embodiment of FIG. 8 are denoted by like reference numerals, and an explanation thereof is omitted here.

Figure 12:
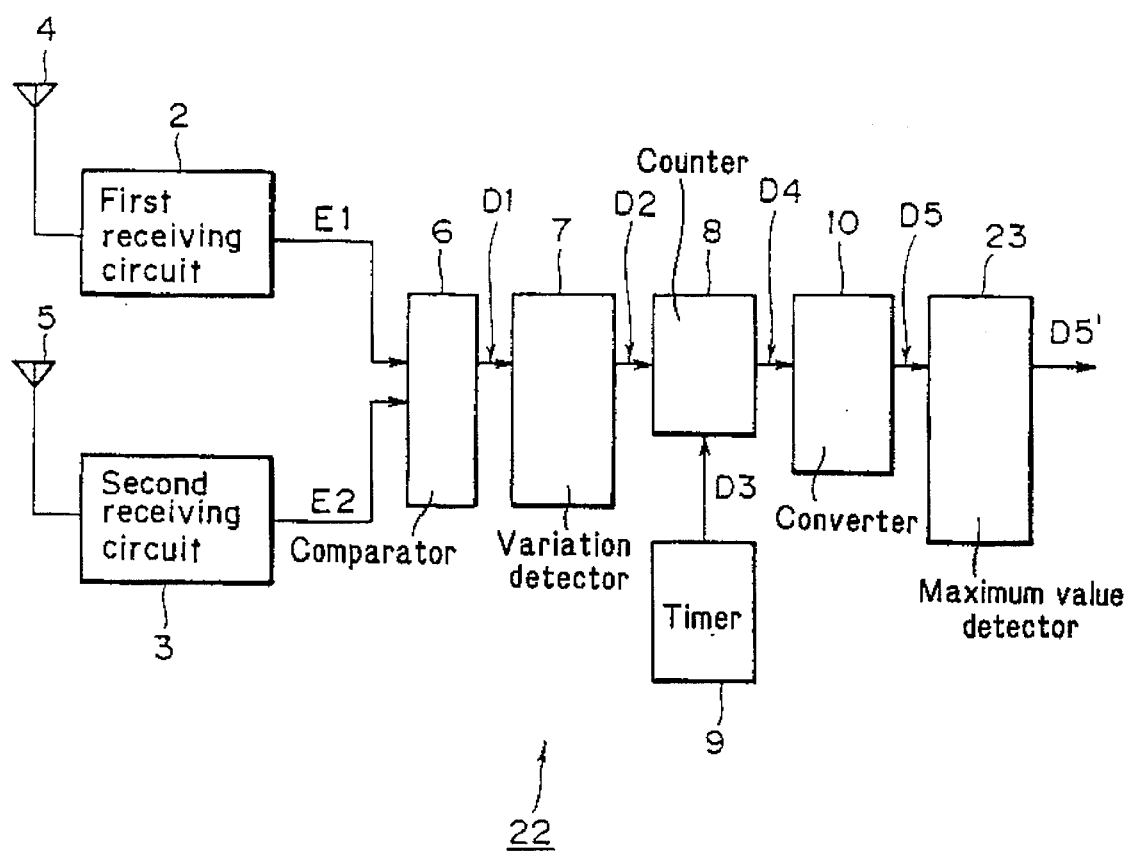
FIG. 12 is a block diagram of a travel velocity detecting apparatus in a mobile communication system according to a 5th embodiment of the invention.

In comparison with the 1st embodiment, the travel velocity detecting apparatus 22 of the 5th embodiment shown in FIG. 12 has such a difference that a maximum value detector circuit 23 is provided posterior to a converter circuit 10 for detecting the maximum value of travel velocity data D5.

The maximum value detector circuit 23 compares the input travel velocity data D5 with the maximum value stored therein and, when the data D5 is greater than the maximum value, the circuit 23 renews the stored maximum value by the data D5 and outputs the same as maximum travel velocity data D5'.

At the start of communication, such start state is detected and the maximum value is reset. Thereafter the first input travel velocity data D5 is regarded as a maximum value, and a comparison of such maximum value with subsequent input data D5 is executed as mentioned until completion of the communication, whereby the maximum travel velocity data D5' is detected.

Thus, also in the 5th embodiment having the construction described above, the same effects as those in the 1st embodiment can be achieved by extracting the travel velocity data D5 from the output side of the converter circuit 10, and further the maximum travel velocity data D5' is detectable as well.

The construction of the 5th embodiment may be modified in such a manner that the maximum value detector circuit 23 is connected between the counter 8 and the converter circuit 10 and, instead of the travel velocity data D5, the maximum of the count value D4 is detected as described. In this case, the maximum of the count value D4 is inputted to the converter circuit 10 via the maximum value detector circuit 23 connected in the modified configuration, so that the travel velocity data corresponding to the maximum count value is outputted as the maximum travel velocity data D5'.

Since the wavelength λ is determined by each radio wave, if merely a single frequency band is used practically in the system, the count value D4 may be converted into the travel velocity data D5 by the converter circuit 10 employed in the 1st to 5th embodiments mentioned above.

However, in the Japanese car telephone for example where an 800 MHz band is currently used and another frequency band is permitted to be used if the former frequency band is rendered full up to limits, there may occur a case where the wavelength λ becomes different even at the same travel velocity, and consequently the spatial change of the radio waves is rendered different. In this case, proper travel velocity data D5 fails to be obtained by the aforementioned conversion in the converter circuit 10.

In such an instance, the construction may be so modified that, differently from any of the 1st to 5th embodiments described above, the wavelength λ (received frequency) is detected by the first or second receiving circuit 2 or 3, and the operation of the converter circuit 10 is performed in accordance with the detected wavelength λ. Or frequency information of the radio channel to be used is acquired from the system side and then the operation of the converter circuit 10 is performed in accordance with such frequency information. However, in the 3rd embodiment of FIG. 10, the construction is so formed that the wavelength λ is detected by the receiving branch including the switching circuit 15.

In a construction where the operation of the converter circuit 10 is performed by utilizing a table, a plurality of tables are prepared correspondingly to individual wavelengths λ to be used for communication, and one of the tables is selected in conformity with the wavelength λ detected by the first or second receiving circuit 2 or 3, and subsequently the travel velocity data D5 corresponding to the count value D4 is retrieved from the selected table and then is outputted.

In another modified construction where the operation of the converter circuit 10 is performed by execution of a program which is based on a conversion equation, the wavelength λ included in the equation $v=(N_{BC}/1.3)\cdot\lambda$ or $v=(N_{BC}/2.6)^{1.2}\cdot\lambda$ is set to be a variable, and the wavelength λ detected by the first or second receiving circuit 2 or 3 is used as such a variable.

According to the above modified constructions other than those of the 1st to 5th embodiments, it is possible to accurately detect proper travel velocity data D5 even if the wavelength λ of the received radio waves is changed during communication.

Next a travel velocity detecting apparatus 25 of a 6th embodiment will be described below with reference to a block diagram of FIG. 13.

Figure 13:
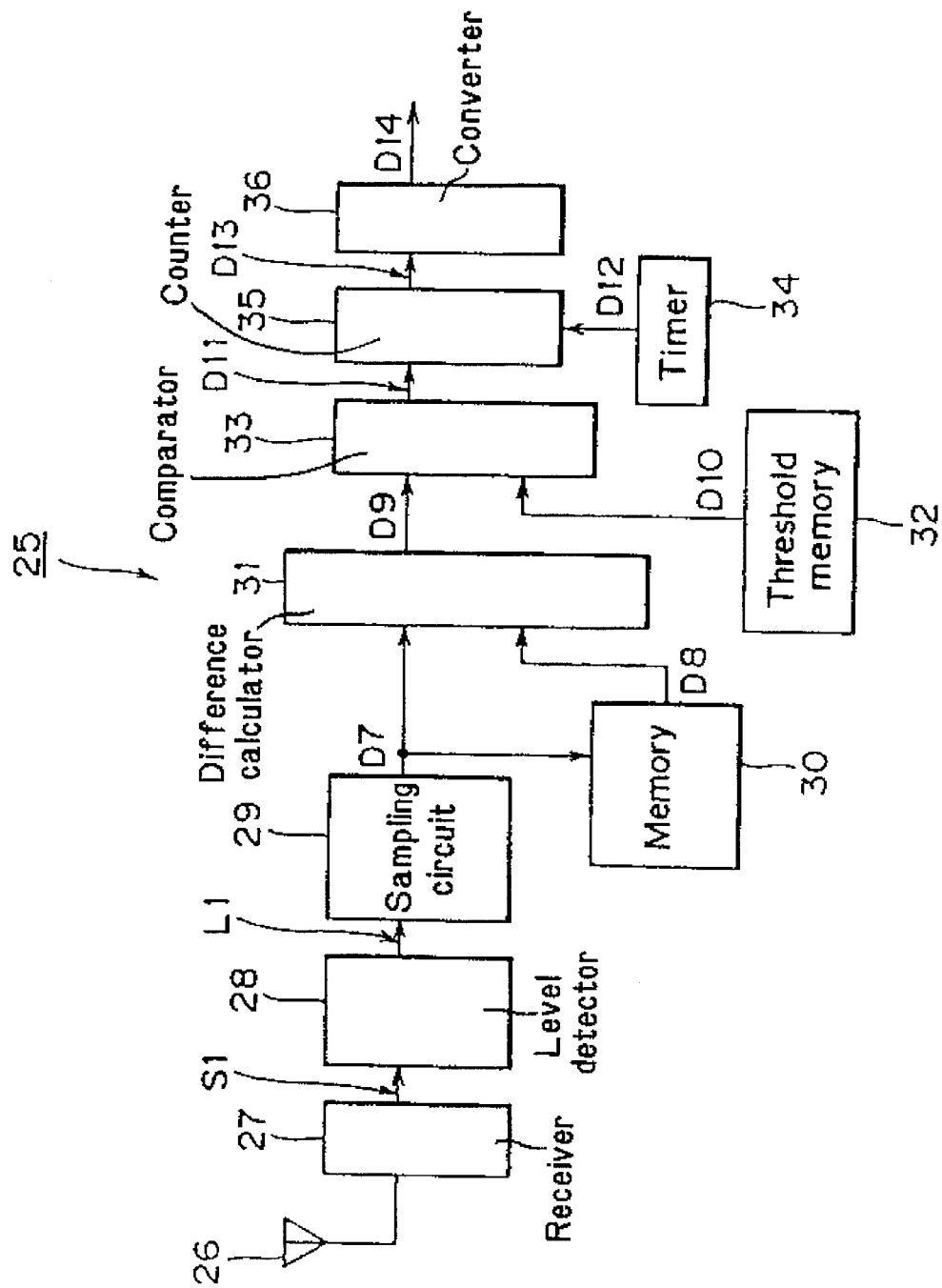
FIG. 13 is a block diagram of a travel velocity detecting apparatus in a mobile communication system according to a 6th embodiment of the invention.

The travel velocity detecting apparatus 25 of the 6th embodiment shown in FIG. 13 comprises an antenna 26, a receiver 27, a level detector circuit 28, a sampling circuit 29, a temporary memory 30, a difference calculator circuit 31, a threshold memory 32, a comparator circuit 33, a timer 34, a counter circuit 35 and a converter circuit 36.

The receiver 27 detects radio communication waves received by the antenna 26 and produces an output signal.

The level detector circuit 28 serves to detect the level of a signal S1 obtained from the receiver 27, and this circuit may consist of, e.g., a signal strength detector.

The sampling circuit 29 samples the received signal level L1, which is outputted from the level detector circuit 28, at a predetermined sampling frequency. This sampling circuit 29 generally consists of an A-D converter. Due to the use of an A-D converter, the process to be executed in the following stages can be realized in either a digital form or an analog form.

The temporary memory 30 stores therein the received level data D7 obtained from the sampling circuit 29. For this memory 30, a delay element may be used when storing the data of one sampling period, or an FIFO memory device or the like may be used when a required delay time is longer than one sampling period. Denoted by D8 is the data once stored in the temporary memory 30 and then outputted therefrom.

The difference calculator circuit 31 calculates the difference between the received level data D8 once stored and the current received level data D7. This circuit 31 may consist of a code inverter and an adder. In the threshold memory 32, a threshold value D10 of a predetermined level is stored.

The comparator circuit 33 compares the difference data D9 with the threshold value D10 and produces a pulse signal (comparison result) D11 when the difference data D9 is greater than the threshold value D10.

The timer 34 produces an enable signal D12, which places the counter circuit 35 in an operable state only for a preset time (e.g., 1 second), at a predetermined or random interval during communication.

The counter circuit 35 counts, for a preset time, the number of times the comparison result D11 obtained from the comparator circuit 33 has exceeded the threshold value D10. More specifically, when a pulse signal D11 is inputted during supply of an enable signal D12, the circuit 35 performs one counting operation in response to each pulse and outputs its count value D13.

The converter circuit 36 converts the relative velocity between the relevant station and the opposite transmitting station from the count result (count value D13) obtained for the preset time.

For example, the converter circuit 36 has a table which is composed of count values 0, 1, 2, . . . , N and travel velocity data assigned correspondingly to such count values. When a count value D13 is inputted, the converter circuit 36 retrieves travel velocity data D14 corresponding to the count value D13 and then outputs the retrieved data.

The count value D13 corresponds to the level variation number $N_{xdB}$ having a correlation to the Doppler frequency $f_D$ as described in connection with the second principle, and the travel velocity data D14 assigned correspondingly to the count values are calculated theoretically according to the second principle or are acquired experimentally.

In the travel velocity detecting apparatus 25 of the construction mentioned, first the radio waves received by the antenna 26 are detected as a signal S1 in the receiver 27 and, after the level L1 of the signal S1 is detected by the level detector circuit 28, the received signal level L1 thus detected is sampled by the sampling circuit 29.

Subsequently the sampled level data D7 is once stored in the temporary memory 30, and the difference between the stored level data D8 and the current received level data D7 is calculated by the difference calculator circuit 31.

The difference data D9 obtained as a result of such calculation is compared with the threshold value D19 by the comparator circuit 33, and when the difference data D9 is greater than the threshold value D10, a pulse signal D11 is outputted from the comparator circuit D11. The pulse signal D11 is counted by the counter circuit 35 only for the preset time determined by the timer 34.

And finally in the converter circuit 36, the travel velocity data D14 corresponding to the count value D13 is retrieved and then is outputted.

According to the travel velocity detecting apparatus 25 of the 6th embodiment described above, the travel velocity of a mobile station can be detected from radio communication waves. And further the apparatus is applicable to both a mobile station and a base station.

Next a travel velocity detecting apparatus 38 of a 7th embodiment will be described below with reference to FIG. 14. In the 7th embodiment of FIG. 14, like component circuits corresponding to those employed in the foregoing 6th embodiment of FIG. 13 are denoted by like reference numerals, and an explanation thereof is omitted here.

Figure 14:
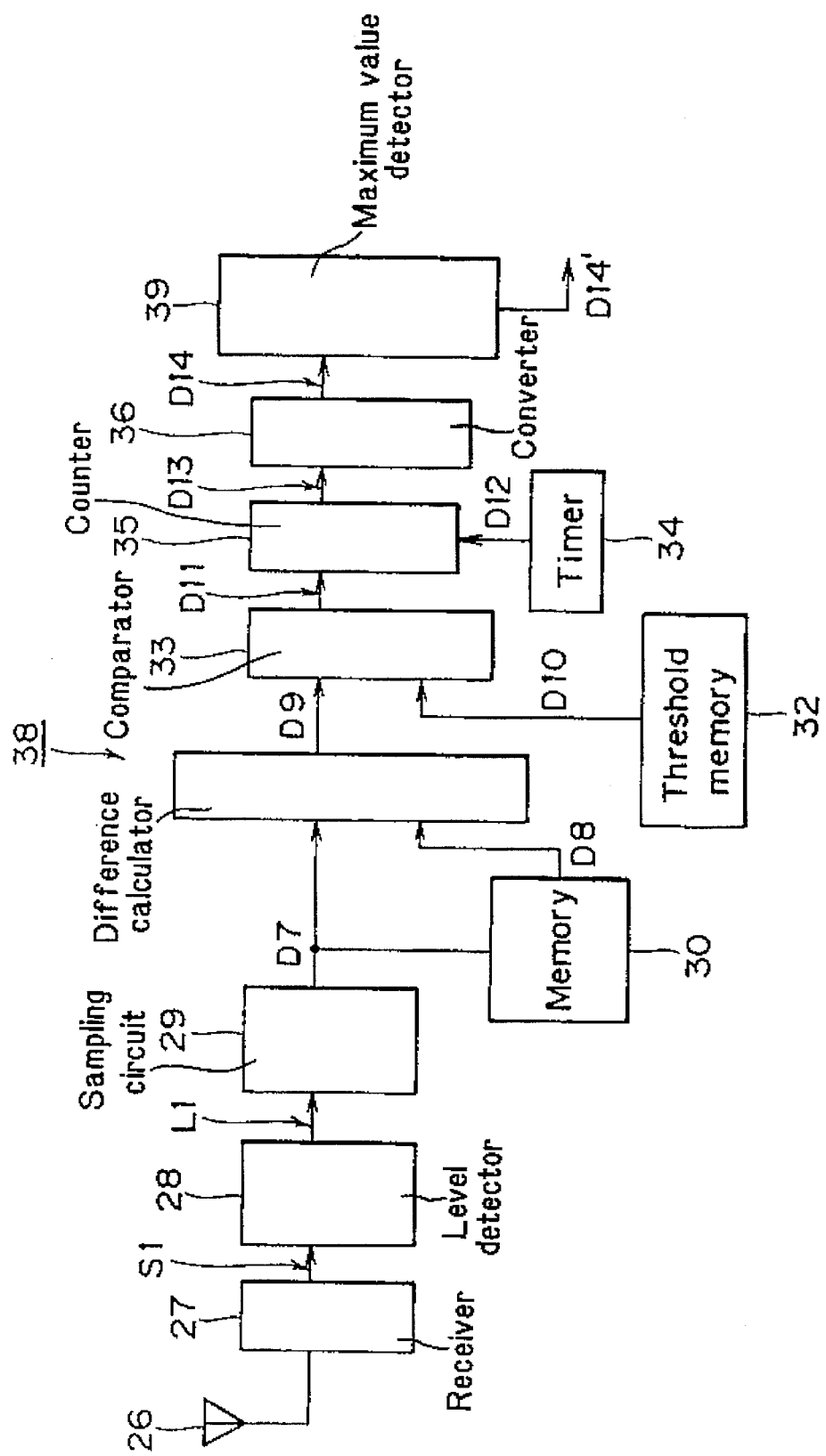
FIG. 14 is a block diagram of a travel velocity detecting apparatus in a mobile communication system according to a 7th embodiment of the invention.

In comparison with the 6th embodiment, the travel velocity detecting apparatus 38 shown in FIG. 14 has a difference in the point that a maximum value detector circuit 39 is provided in a stage posterior to the converter circuit 36 so as to detect the maximum value of the travel velocity data D14.

The maximum value detector circuit 39 is reset at the start of each communication for example and, when the travel velocity obtained at a fixed time interval is greater than the preceding maximum value, functions to hold and output such travel velocity as a new maximum value. More specifically, according to this function, the input travel velocity data D14 is compared with the maximum value stored in the circuit 39, and when the data D14 is greater than the stored maximum value, the data D14 is held as a renewed maximum value while being outputted as maximum travel velocity data D14'. This function can be realized with facility by a combination of a comparator and a latch circuit.

In the above construction also, it is possible to achieve the same effects as those in the 6th embodiment by acquiring the travel velocity data D14 from the output side of the converter circuit 36. And further the maximum travel velocity data D14' can be detected as well.

Next a travel velocity detecting apparatus 41 of an 8th embodiment will be described with reference to FIG. 15. In the 8th embodiment shown in FIG. 15, like component circuits corresponding to those employed in the aforementioned 1st embodiment of FIG. 8 are denoted by like reference numerals, and an explanation thereof is omitted here.

Figure 15:
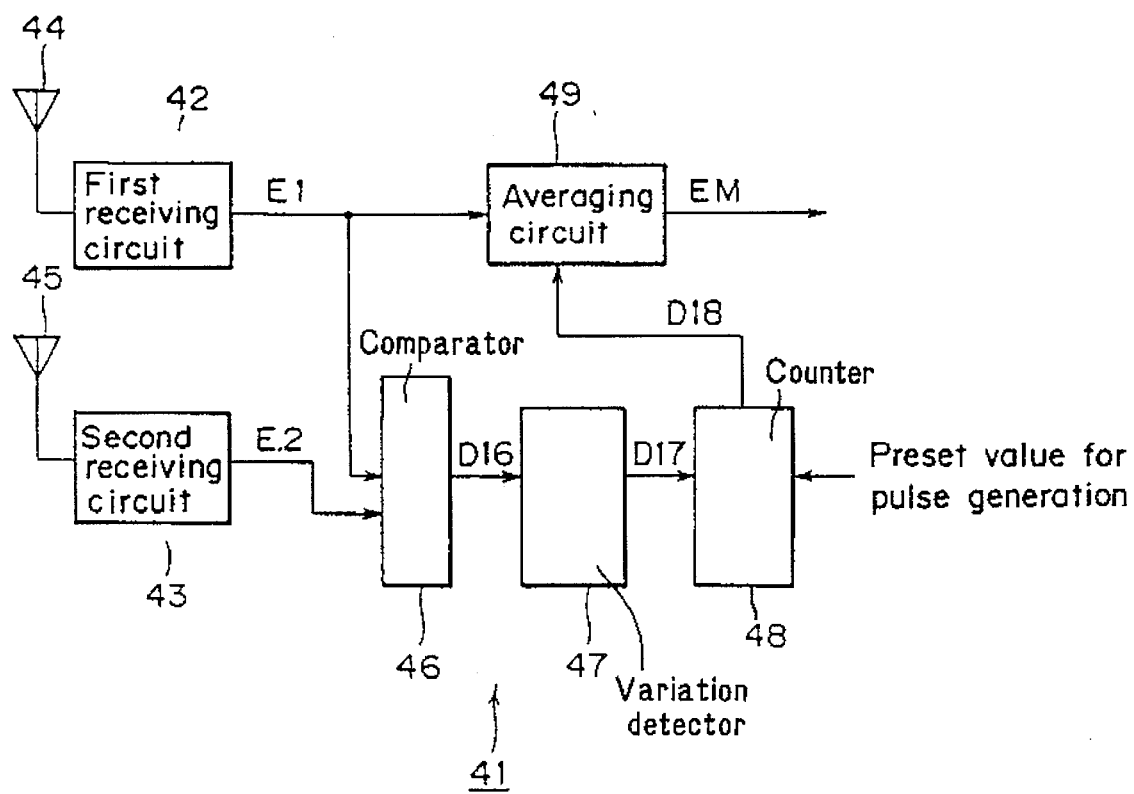
FIG. 15 is a block diagram of a travel velocity detecting apparatus in a mobile communication system according to an 8th embodiment of the invention.

The travel velocity detecting apparatus 41 of the 8th embodiment shown in FIG. 15 is installed in a mobile station of a car telephone or a portable telephone in a mobile communication system and is capable of detecting the received level of radio communications waves, which are transmitted thereto from a base station, adaptively in accordance with the travel velocity of the relevant mobile station.

The travel velocity detecting apparatus 41 is equipped with two receiving branches of mutually unrelated channels, wherein there are included a first receiving circuit 42 of one receiving branch, and a second receiving circuit 43 of the other receiving branch. Such two receiving circuits 42, 43 detect radio communication waves received by antennas 44, 45 respectively and, after detection of the received levels E1, E2, deliver the levels as outputs therefrom.

Reference numeral 46 denotes a comparator circuit which compares the received levels E1 and E2 with each other and outputs comparison data D16 of "1" when E1>E2 or outputs comparison data D16 of "0" when E1<E2. Meanwhile when E1=E2, the comparator circuit 46 outputs the preceding comparison data D16.

Reference numeral 47 denotes a variation detector circuit which produces merely a single pulse signal D17 in response to a change of the comparison data D16 from "0" to "1" or from "1" to "0".

Denoted by 48 is a counter circuit. This counter circuit 48 performs one counting operation in response to each pulse of the pulse signal D17 and counts up when the count value thereof has reached a preset value, thereby outputting a count-up signal D18 of a single pulse. In this case, the count value of the counter circuit 48 corresponds to the receiving-circuit switching number (branch switching frequency) described in connection with the first principle.

Denoted by 49 is an averaging circuit. During the time period from an initial state to input of a count-up signal D18, the averaging circuit 49 executes a temporal averaging process of the received levels E1 fed from the first receiving circuit 42 and then outputs the resultant average value as an average received level EM. The averaging circuit 49 is reset to be initialized immediately after outputting the average received level EM, and then resumes its calculation of averaging the received levels E1.

According to the travel velocity detecting apparatus 41 of the construction described above, the received levels E1, E2 of radio communication waves are detected by the first and second receiving circuits 42, 43, and then such levels E1 and E2 are compared with other by the comparator circuit 46.

Subsequently, comparison data D11 such as "1010010110101..." obtained as a result of the comparison is inputted to a variation detector circuit 47, where the variation points are detected. In other words, the number of times of switching the receiving circuits 42 and 43 is obtained in this circuit 47.

Pulse signals D17 equal in number to the variation points are outputted from the variation detector circuit 47 and then are counted by a counter circuit 48.

It is assumed here that the counter circuit 48 is so preset as to perform its count-up operation at a count value 50.

When the count value has reached 50, a count-up signal D18 is supplied to the averaging circuit 49, from which the average value of the received levels E1 is outputted as an average received level EM.

In the travel velocity detecting apparatus 41 of the 8th embodiment described above, the received levels are detected in conformity with the number of times of switching the receiving circuits 42 and 43, so that the received levels are accurately detectable regardless of the travel velocity of the mobile station. Consequently, the received level can be detected adaptively to the travel velocity of the mobile station.

Furthermore, due to the nonnecessity of calculating the travel velocity differently from the prior art, the travel velocity estimation means required heretofore in the conventional apparatus is no longer needed to eventually attain a dimensional reduction of the whole apparatus.

Next a travel velocity detecting apparatus 51 of a 9th embodiment will be described below with reference to FIG. 16. In the 9th embodiment of FIG. 16, like component circuits corresponding to those employed in the 8th embodiment of FIG. 15 are denoted by like reference numerals, and an explanation thereof is omitted here.

Figure 16:
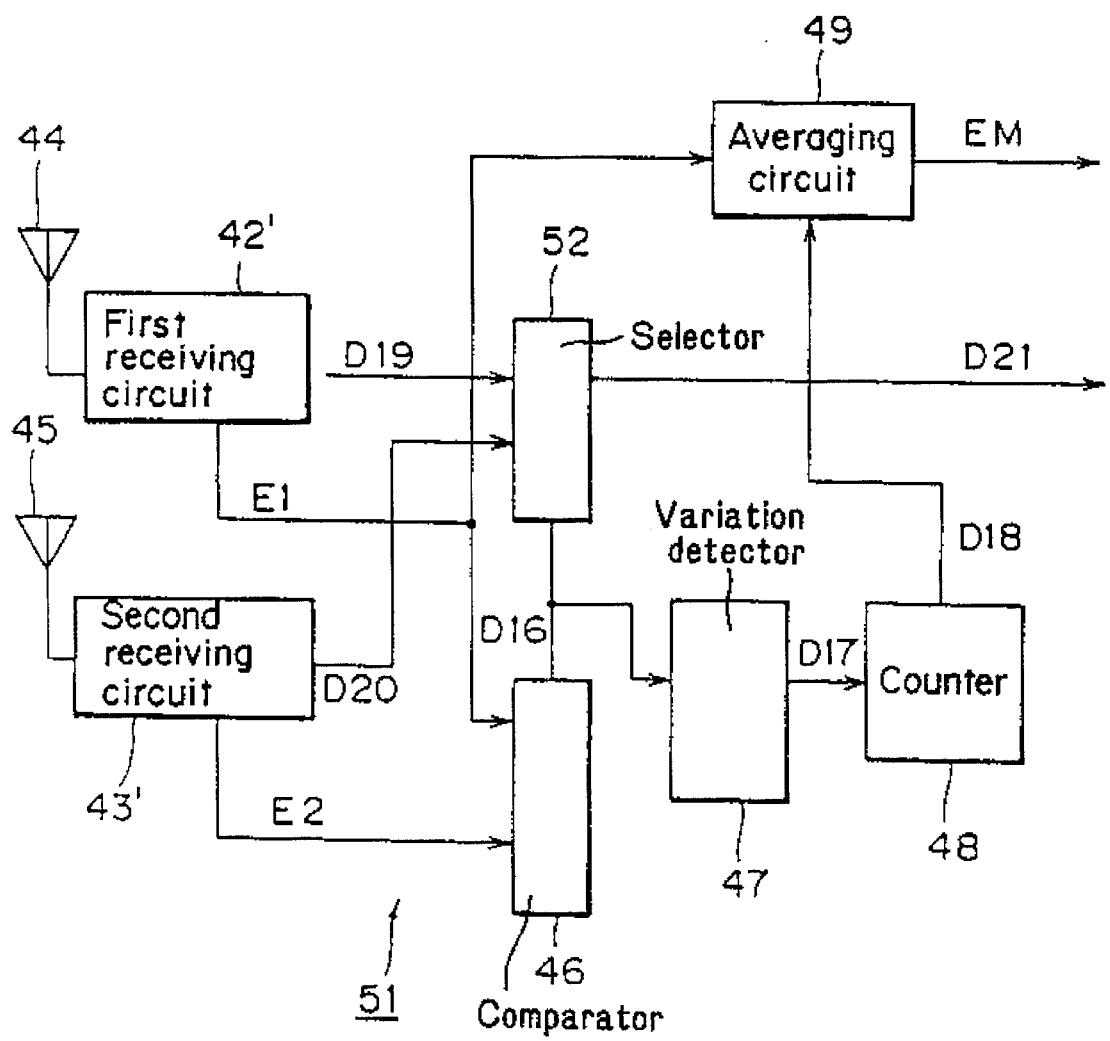
FIG. 16 is a block diagram of a travel velocity detecting apparatus in a mobile communication system according to a 9th embodiment of the invention.

The travel velocity detecting apparatus 51 of the 9th embodiment shown in FIG. 16 comprises the circuits of the foregoing 8th embodiment shown in FIG. 15 with another function to perform a post-detection synthetic diversity.

In particular, the difference from the 8th embodiment resides in that one of the received data D18 and D20 obtained respectively from first and second receiving circuits 42' and 43', which serve as diversity branches, is selected in accordance with comparison data D16, and the selected data D19 (or D20) is outputted as received data D21 which is delivered to an unshown telephone earpiece.

The effects achieved in the travel velocity detecting apparatus 51 of the 9th embodiment is similar to those in the foregoing 8th embodiment.

Next a travel velocity detecting apparatus 54 of a 10th embodiment will be described below with reference to FIG. 17. In the 10th embodiment of FIG. 17, like component circuits corresponding to those employed in the 8th embodiment of FIG. 15 are denoted by like reference numerals, and an explanation thereof is omitted here.

Figure 17:
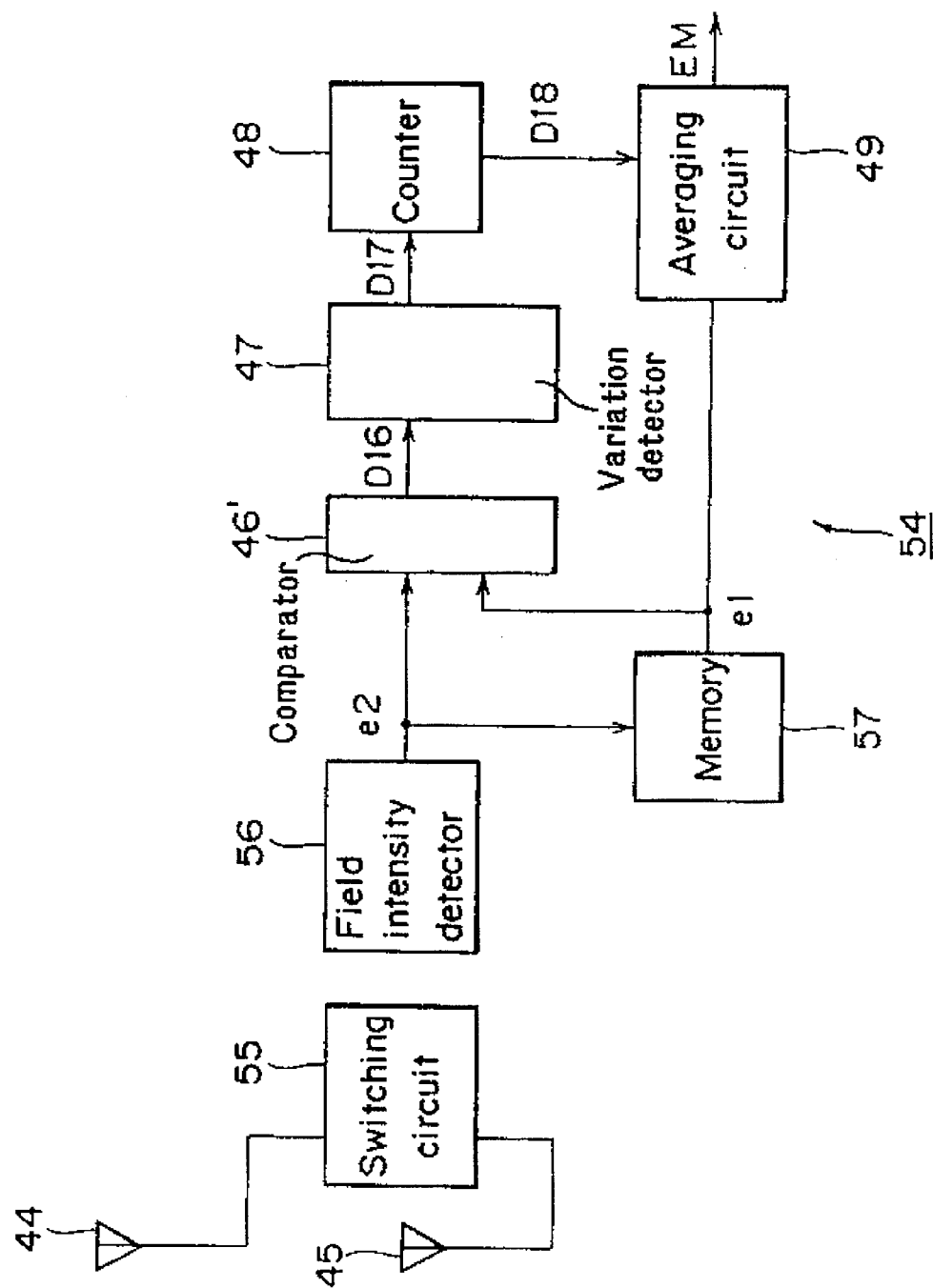
FIG. 17 is a block diagram of a travel velocity detecting apparatus in a mobile communication system according to a 10th embodiment of the invention.

The travel velocity detecting apparatus 54 of the 10th embodiment shown in FIG. 17 is equipped with a function to perform an antenna switching diversity. In this apparatus, electric field intensities of radio waves received by antennas 44 and 45 of two channels are measured within a short time period and then are compared with each other. Subsequently the number of times of switching the receiving branches is counted, and the average received level EM is detected on the basis of the count value.

First the antennas 44 and 45 are switched in a short time period by means of a switching circuit 55, so that radio waves fed to the antennas 44 and 45 are alternately received.

Subsequently the electric field intensities e1 and e2 of the radio waves alternately received are detected by and outputted from a field intensity detector circuit 56. It is defined here that the field intensity e1 indicates the radio waves received by the antenna 44, while the field intensity e2 indicates the radio waves received by the antenna 45, and also that the intensity of the radio waves received by the antenna 44 is detected first.

The detected field intensities e1 are successively stored in a memory 57 and then are outputted therefrom. In a comparator circuit 46' of a posterior stage, the field intensity e1 outputted from the memory 57 is compared with the field intensity e2 obtained by a subsequent antenna switching operation. The circuit 46 produces comparison data D16 of "1" when the comparison result signifies e1>e2, or produces comparison data D16 of "0" when the result signifies e1<e2. Meanwhile, when e1=e2, the preceding comparison data D16 is outputted.

Thereafter the process explained in connection with the 8th embodiment is executed in the circuits posterior to the variation detector circuit 47, and finally an average received level EM is obtained. Consequently the effects similar to those of the 8th embodiment are achievable also in the travel velocity detecting apparatus 54 of the 10th embodiment.

In the same procedure as the above, similar effects can be achieved by inputting the field intensity e2 to the averaging circuit 49 in FIG. 17.

Next a travel velocity detecting apparatus 59 of an 11th embodiment will be described below with reference to FIG. 18. In the 11th embodiment of FIG. 18, like component circuits corresponding to those employed in the 8th embodiment of FIG. 15 are denoted by like reference numerals, and an explanation thereof is omitted here.

Figure 18:
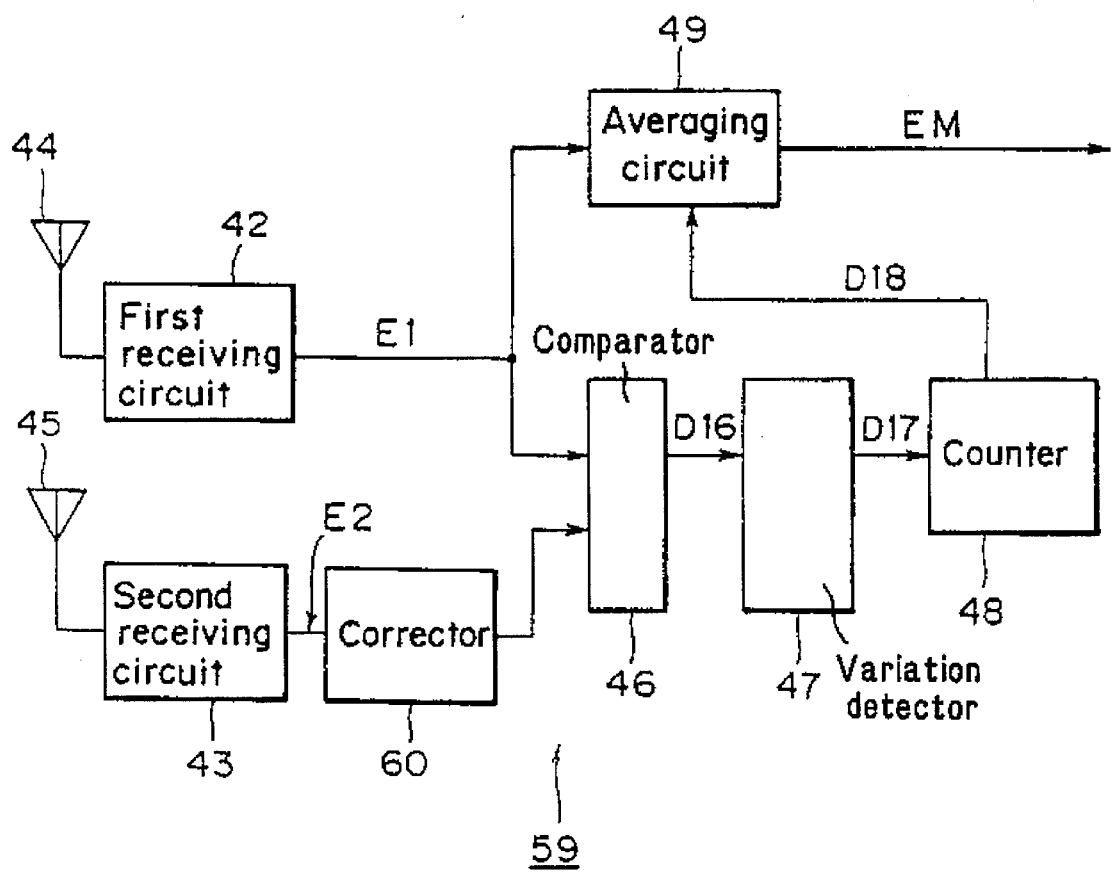
FIG. 18 is a block diagram of a travel velocity detecting apparatus in a mobile communication system according to an 11th embodiment of the invention.

In the travel velocity detecting apparatus 59 of the 11th embodiment shown in FIG. 18, the difference from the 8th embodiment resides in that a corrector circuit 60 is provided in a stage posterior to the second receiving circuit 43 so as to detect and correct any gain difference that may exist between the first and second receiving circuits 42 and 43. However, the corrector circuit 60 may be provided in a stage posterior to the first receiving circuit 42.

Such correction of the gain difference is needed for the reason that a proper comparison fails to be performed in case the received levels E1 and E2 having any gain difference therebetween are compared with each other by the comparator circuit 46.

According to the 11th embodiment mentioned, the same effects are achievable as in the 8th embodiment and, even when any gain difference is existent between the two receiving branches, the average received level EM can be properly obtained by correcting such a gain difference.

In addition, the same effects are also achieved by inputting the level E2' to the averaging circuit 49 in FIG. 18.

Next a travel velocity detecting apparatus 62 of a 12th embodiment will be described below with reference to FIG. 19. In the 12th embodiment of FIG. 19, like component circuits corresponding to those employed in the 8th embodiment of FIG. 15 are denoted by like reference numerals, and an explanation thereof is omitted here.

Figure 19:
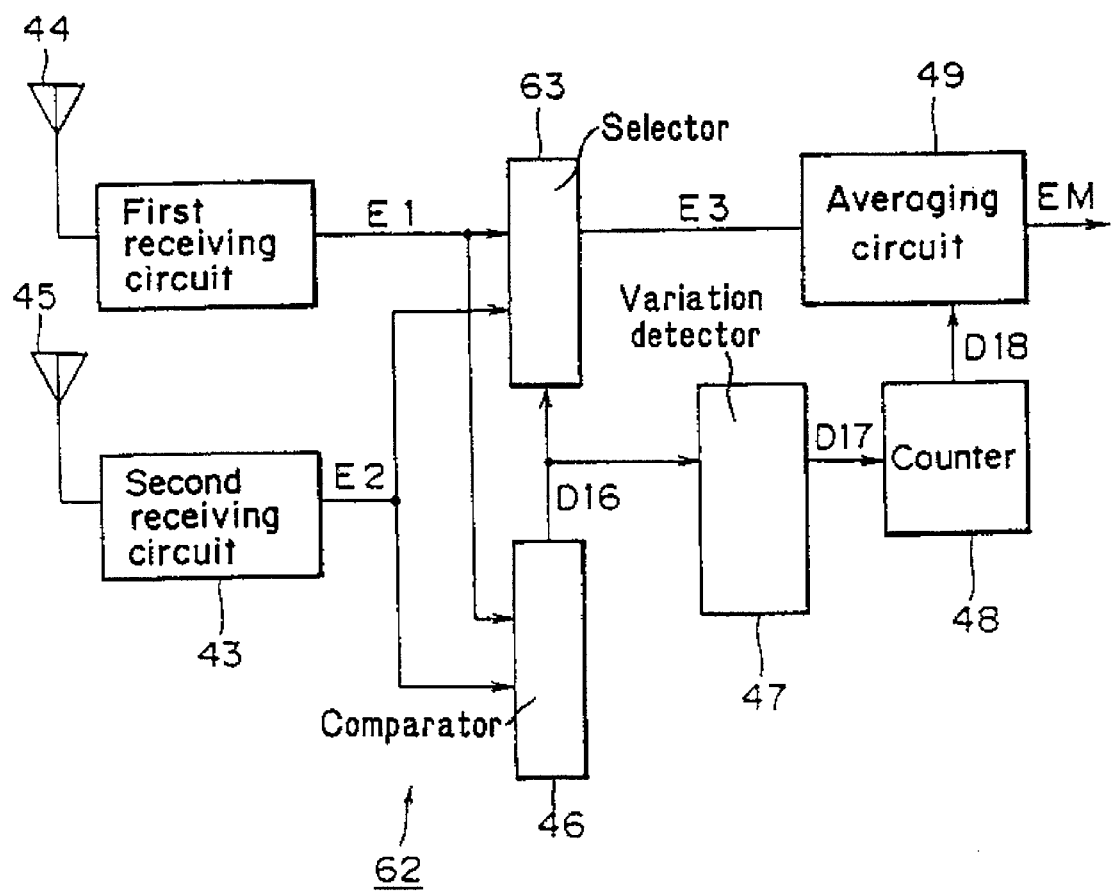
FIG. 19 is a block diagram of a travel velocity detecting apparatus in a mobile communication system according to a 12th embodiment of the invention.

In comparison with the aforementioned 8th embodiment, the travel velocity detecting apparatus 62 of the 12th embodiment shown in FIG. 19 has a difference in the point that a higher one of the received levels E1 and E2 is selected by means of a selector circuit 63, and the selected level E3 is temporally averaged.

More specifically, when the output data D16 of the comparator circuit 46 signifies that the received level E2 is higher, the level E2 is selected by the selector circuit 63 and then is outputted to the averaging circuit 49. Meanwhile, when the data D16 signifies that the received level E1 is higher, the level E1 is selected by the selector circuit 63 and then is outputted to the averaging circuit 49.

In the averaging circuit 49, therefore, the higher received level E1 or E2 is temporally averaged to consequently attain an advantage that the average received level EM obtainable in this embodiment is higher in gain than the level in any of the embodiments mentioned heretofore. The other effects are similar to those in the 8th embodiment.

Next a travel velocity detecting apparatus 65 of a 13th embodiment will be described below with reference to FIG. 20. In the 13th embodiment of FIG. 20, like component circuits corresponding to those employed in the 8th embodiment of FIG. 15 are denoted by like reference numerals, and an explanation thereof is omitted here.

Figure 20:
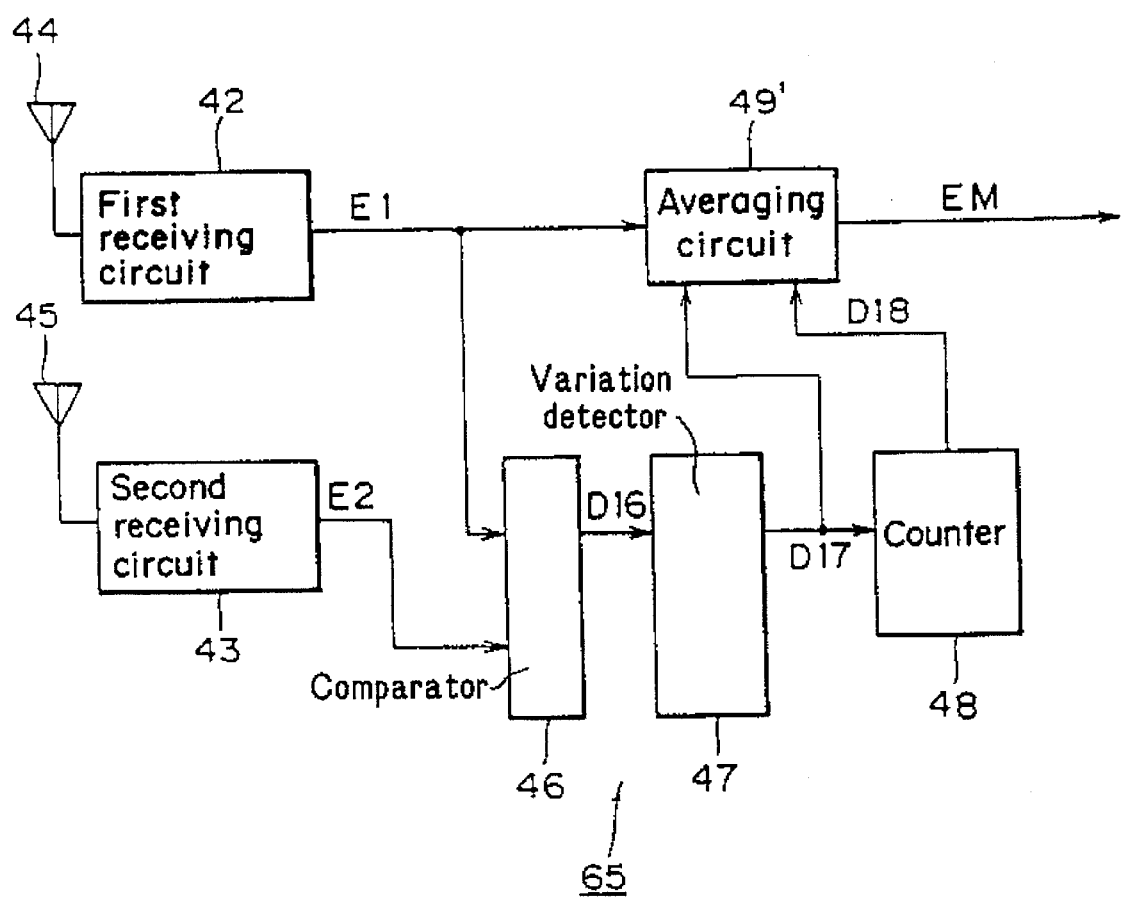
FIG. 20 is a block diagram of a travel velocity detecting apparatus in a mobile communication system according to a 13th embodiment of the invention.

The travel velocity detecting apparatus 65 of the 13th embodiment shown in FIG. 20 is characterized in its constitution where sample values of the received level E1 or E2 are partially excluded from the temporal averaging in accordance with the switching frequency of receiving circuits 42 and 43.

An averaging circuit 49' is supplied with output data D17 of a variation detector circuit 47 which indicates a variation in the numerical relationship between the received levels E1 and E2, wherein the received level E1 is temporally averaged only during a supply of the data D17.

More specifically, a sample value of the received level E1, which is obtained in the absence of a variation in the numerical relationship between the received levels E1 and E2, is excluded from the temporal averaging. Thus, the averaging operation is performed merely by the use of statistically effective sample values, hence reducing the circuit scale inclusive of an integrator required for the averaging. The other effects are the same as those in the aforementioned 8th embodiment.

Next a travel velocity detecting apparatus 67 of a 14th embodiment will be described below with reference to FIG. 21. In the 14th embodiment of FIG. 21, like component circuits corresponding to those employed in the 8th embodiment of FIG. 15 are denoted by like reference numerals, and an explanation thereof is omitted here.

Figure 21:
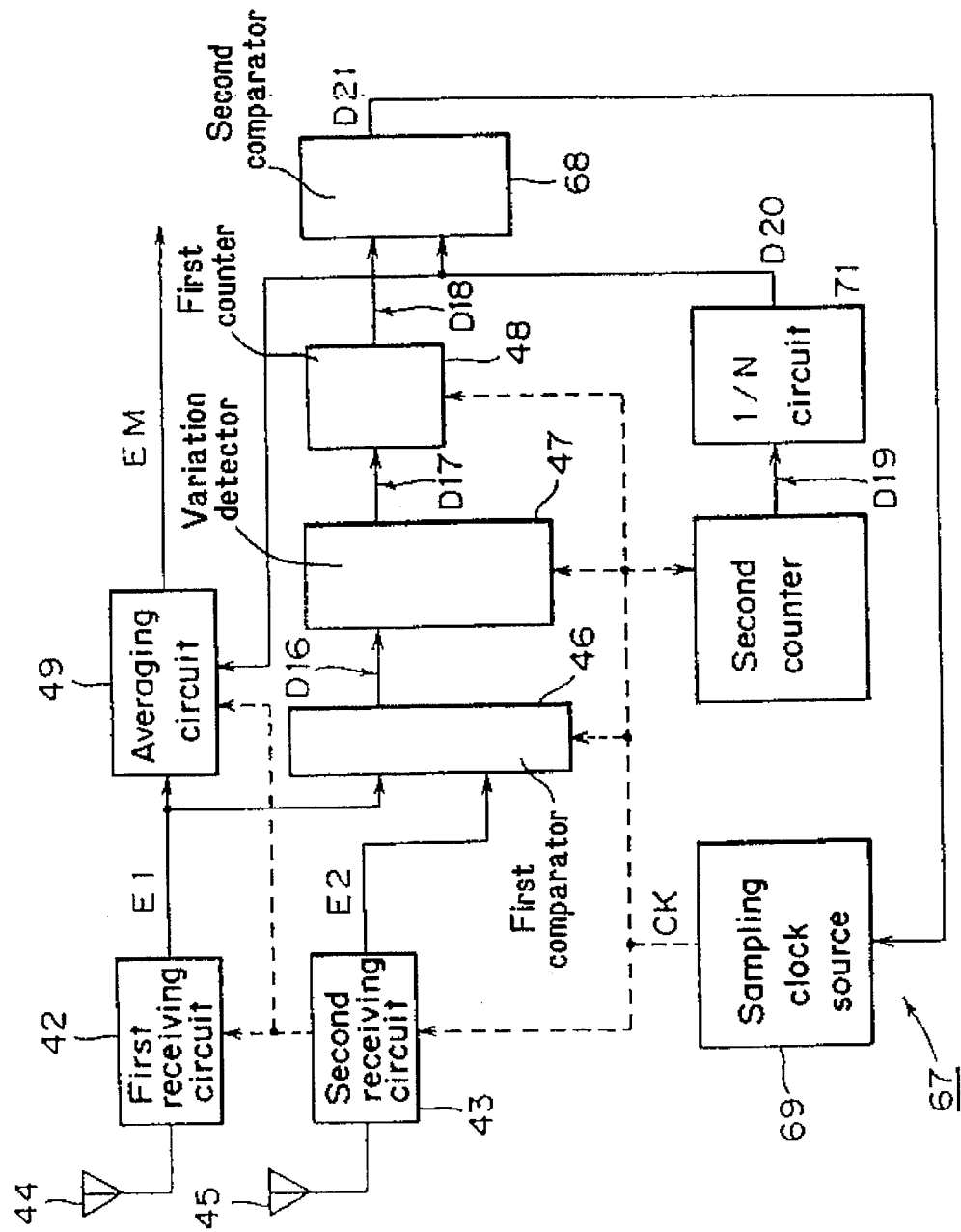
FIG. 21 is a block diagram of a travel velocity detecting apparatus in a mobile communication system according to a 14th embodiment of the invention.

The travel velocity detecting apparatus 67 of the 14th embodiment shown in FIG. 21 is characterized in its constitution where the received-level sampling frequency is controlled in accordance with the switching frequency of receiving circuits 42 and 43.

In FIG. 21, there are shown a second comparator circuit 68, a sampling clock source 69, a second counter circuit 70, and a 1/N circuit 71.

The sampling clock source 69 delivers an operation clock signal CK to the circuits indicated by broken lines. The frequency of the operation clock signal CK is changed in accordance with the output data D21 of the second comparator circuit 68.

The second counter circuit 70 counts the frequency of the operation clock signal CK, and the 1/N circuit 71 divides the count value D19 of the second counter circuit 70 into 1/N and then outputs the divided value.

It is defined here that 1/N is set to a value smaller than ½, e.g., to ⅓.

The second comparator circuit 68 compares data D11, which is ⅓ of the count value D19, with data D18 indicative of the branch switching frequency, and produces output data D21 which represents the difference between the compared data D20 and D18.

In the travel velocity detecting apparatus 67 of the above-described construction, the following operation is performed. The data D18 and D20 are compared with each other by the second comparator circuit 68. And if the result signifies that the branch switching frequency is greater than ⅓ of the count value of the operation clock signal CK, the sampling clock source 69 is so controlled as to raise the frequency of the operation clock signal CK.

Meanwhile, if the branch switching frequency is smaller than ⅓ of the count of the operation clock signal CK, the sampling clock source 69 is so controlled as to lower the frequency of the operation clock signal CK.

Such control action is executed for the following reason. When the sampling frequency is low and the individual sample values of the received levels E1 and E2 are statistically independent, the branch switching frequency is exactly equal to ½ of the sampling frequency. Therefore the sampling frequency is so adjusted as to render the branch switching frequency slightly lower than ½ of the sampling frequency.

The branch switching points can be caught more precisely if the rate of sampling the received levels E1 and E2 is increased by raising the sampling frequency. In such a case, however, the circuits are more complicated and enlarged in scale. Therefore the construction is adequately formed in such a manner as to ensure a practically high probability of catching the switching points while simplifying the circuit configuration and suppressing the same to a small scale.

According to the 14th embodiment described above, it is possible to detect the received level adaptively to the travel velocity of the mobile station and is further possible to realize a small-scale circuit configuration.

Next a travel velocity detecting apparatus 73 of a 15th embodiment will be described below with reference to FIG. 22. In the 15th embodiment of FIG. 22, like component circuits corresponding to those employed in the 1st embodiment of FIG. 8 are denoted by like reference numerals, and an explanation thereof is omitted here.

Figure 22:
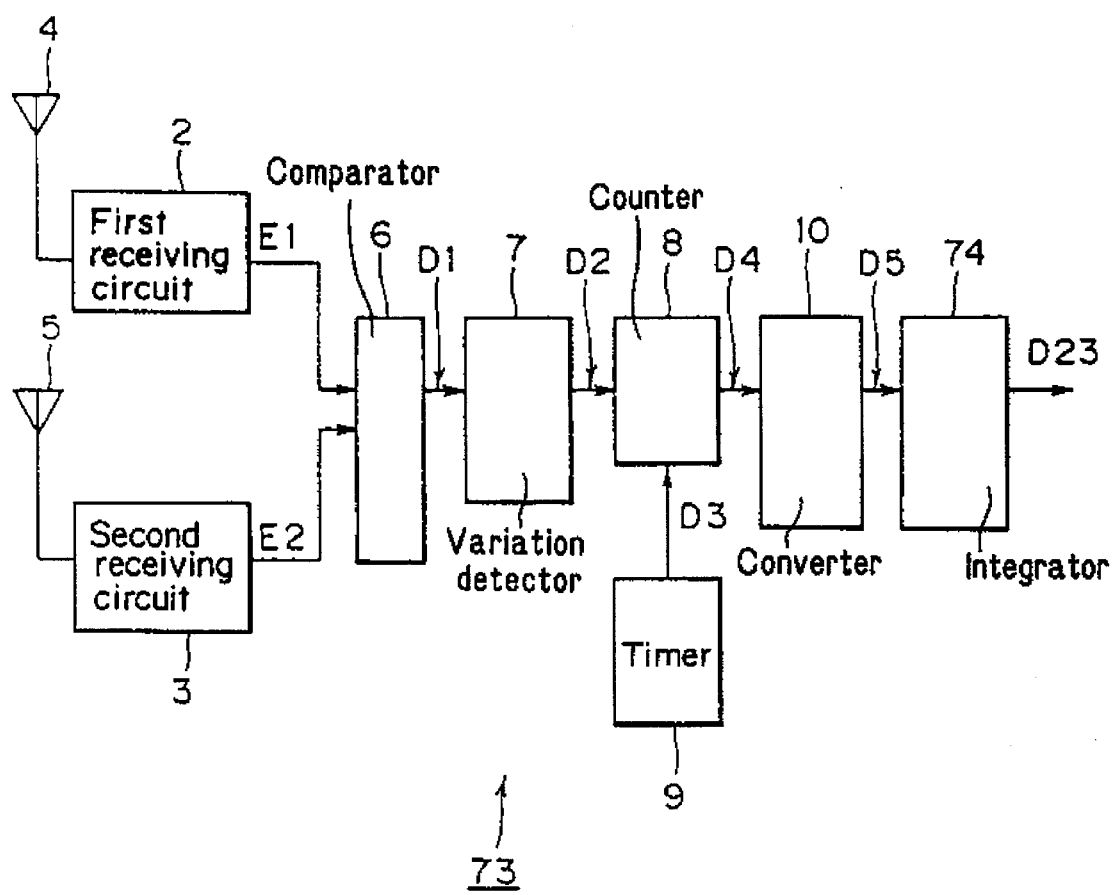
FIG. 22 is a block diagram of a travel velocity detecting apparatus in a mobile communication system according to a 15th embodiment of the invention.

In comparison with the 1st embodiment, the travel velocity detecting apparatus 73 shown in FIG. 22 has a difference in the point that an integrator circuit 74 for integrating travel velocity data D5 is provided in a stage posterior to the converter circuit 10. Such integration of the travel velocity data D5 is executed for the purpose of calculating the travel distance of the mobile station.

More specifically, with regard to the travel velocity (speed) v(t) at an instant t, a passage distance l(t) from an instant 0 is obtained by integrating the travel velocity v(t) as expressed below.

$$l(t) = \int_0^t v(t') \, dt'$$

where an instant 0 signifies a communication start time.

As a result, data D23 indicating the travel distance of the mobile station is outputted from the integrator circuit 74.

Consequently, according to the 15th embodiment, the travel distance of the mobile station during communication can be obtained from the passage distance data D23.

Next a travel velocity detecting apparatus 76 of a 16th embodiment will be described below with reference to FIG. 23. In the 16th embodiment of FIG. 23, like component circuits corresponding to those employed in the 1st embodiment of FIG. 8 are denoted by like reference numerals, and an explanation thereof is omitted here.

Figure 23:
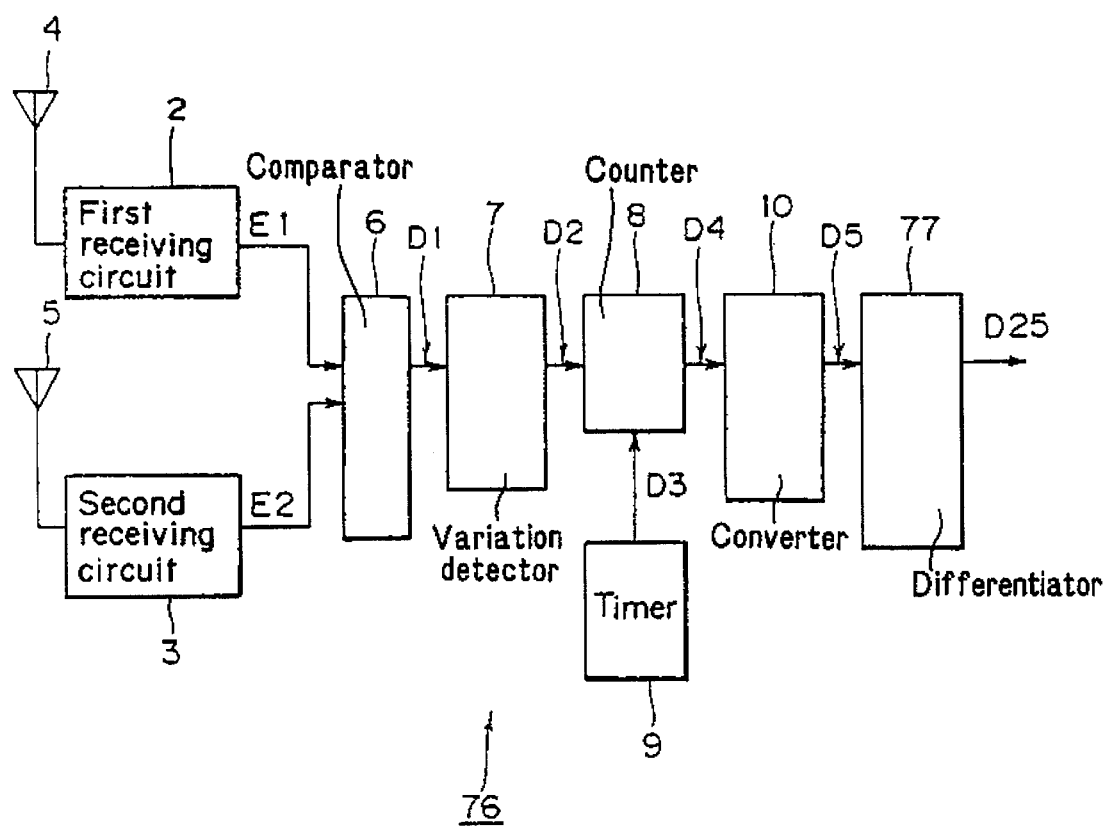
FIG. 23 is a block diagram of a travel velocity detecting apparatus in a mobile communication system according to a 16th embodiment of the invention.

In comparison with the 1st embodiment, the travel velocity detecting apparatus 76 of the 16th embodiment shown in FIG. 23 has a difference in the point that a differentiator circuit 77 for differentiating the travel velocity data D5 is provided in a stage posterior to the converter circuit 10. Such differentiation of the travel velocity data D5 is executed for the purpose of calculating the acceleration of the mobile station.

More specifically, the acceleration a(t) representing the change rate of the travel velocity can be obtained by differentiating the travel velocity v(t) as follows.

$$a(t)=dv(t)/dt$$

As a result, data D22 indicating the acceleration of the mobile station is outputted from the differentiator circuit 77.

Consequently, according to the 16th embodiment, the acceleration of the mobile station can be obtained from the acceleration data D25.

Next a travel velocity detecting apparatus 79 of a 17th embodiment will be described below with reference to FIG. 24. In the 17th embodiment of FIG. 24, like component circuits corresponding to those employed in the 6th embodiment of FIG. 13 are denoted by like reference numerals, and an explanation thereof is omitted here.

Figure 24:
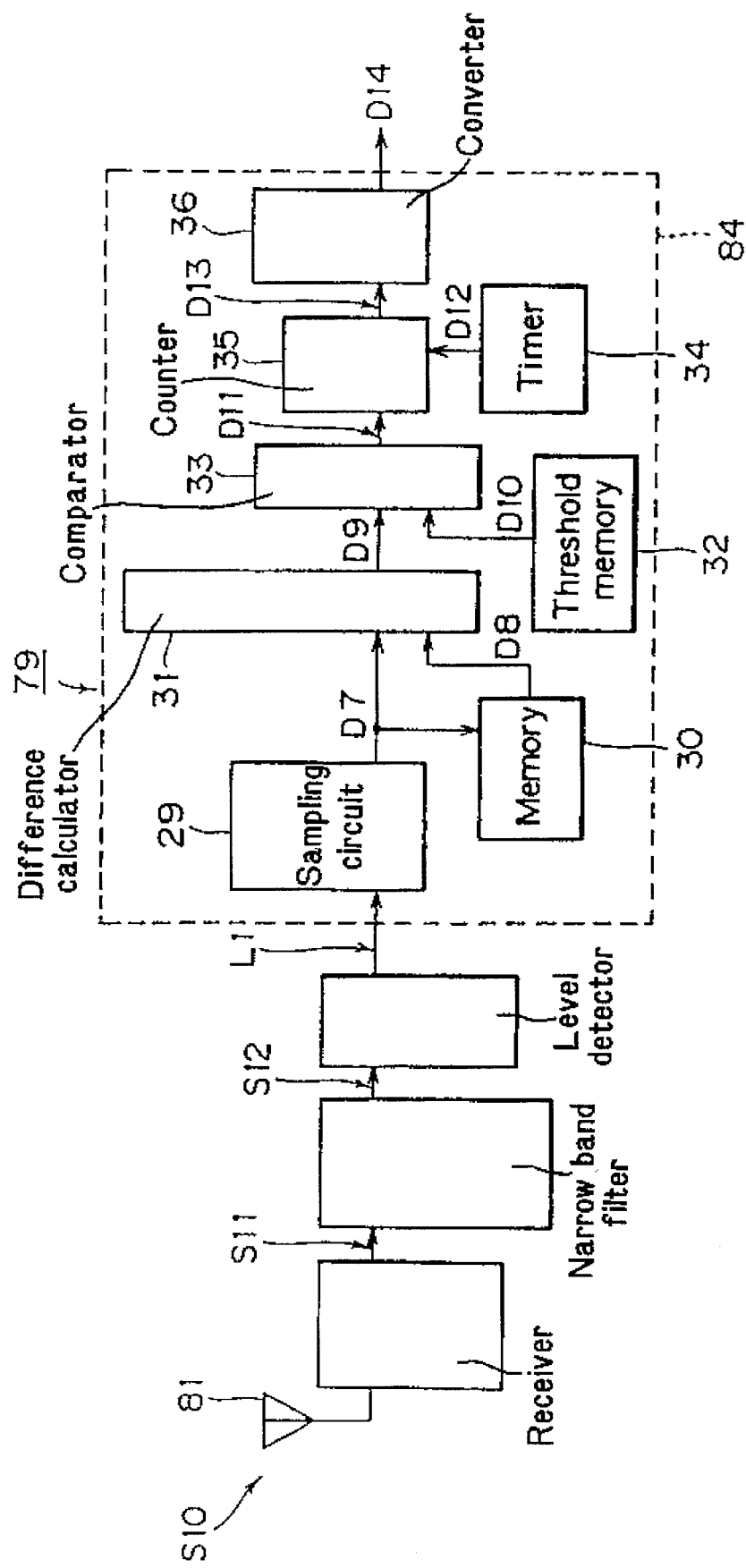
FIG. 24 is a block diagram of a travel velocity detecting apparatus in a mobile communication system according to a 17th embodiment of the invention.

The travel velocity detecting apparatus 79 shown in FIG. 24 detects the travel velocity by receiving a wide-band radio signal S10. Each of the 1st to 15th embodiments mentioned hereinabove is a type which receives narrow-band radio waves for the reason of utilizing the Rayleigh fading that occurs when the radio waves are in a narrow band, as explained in connection with the first and second principles.

Figure 25:
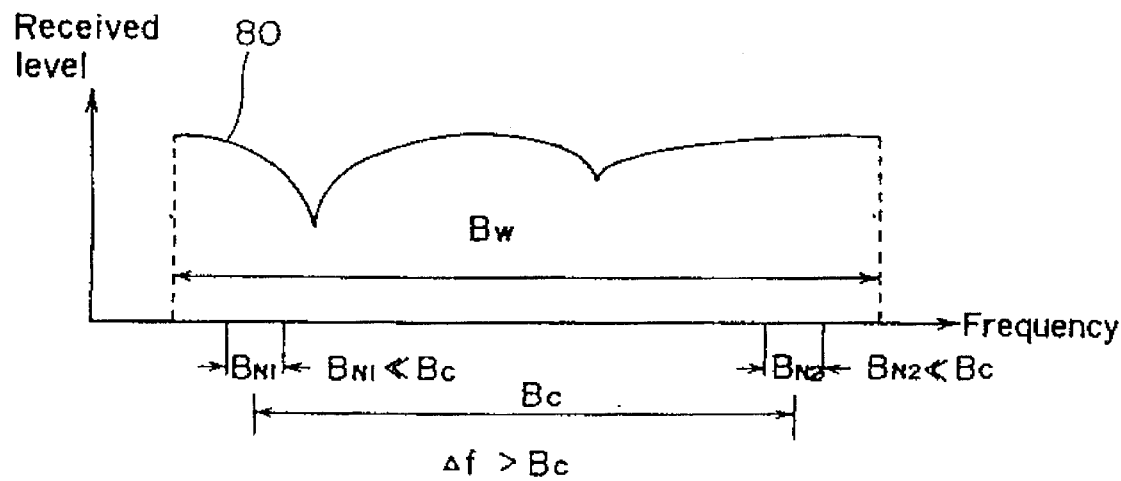
FIG. 25 graphically illustrates the principle in the case of extracting a narrow band signal through a narrow band filter from a wide band radio frequency signal.

However, in wide-band radio transmission as shown in FIG. 25, there is observed a phenomenon termed frequency selective fading where level variations are caused nonuniformly over the entire transmission bandwidth $B_w$, and the received levels are different depending on the individual frequencies as indicated by a curve 80.

In the case of such frequency selective fading, level variations are caused in the input signal power of the entire band and are therefore different from those in the Rayleigh fading.

In other words, a variety of level variation patterns are induced in compliance with an extension of the transmission bandwidth $B_w$, so that it is impossible to calculate the travel velocity, on the basis of the first and second principles, from the received level variations in the wide-band radio signal S10.

However, if the bandwidth of the wide-band radio signal S10 is limited by means of, e.g., a filter of a narrow bandwidth (denoted by $B_{N1}$ or $B_{N2}$ in FIG. 25), the Rayleigh fading can be utilized for the narrow-band signal obtained by the above means. Therefore it becomes possible to calculate the travel velocity on the basis of the first and second principles.

The travel velocity detecting apparatus 79 shown in FIG. 24 is constructed on the basis of the theory mentioned, wherein the above-described narrow band filter is connected between the receiver 27 and the level detector circuit 28 employed in the travel velocity detecting apparatus 25 of the 6th embodiment shown in FIG. 13. However, the aforementioned receiver 27 is replaced here with a receiver 82 which is capable of detecting the wide-band radio signal S10 shown in FIG. 24.

According to the travel velocity detecting apparatus 79 of such construction, first the radio waves received by an antenna 81 are detected in the receiver 82. And the bandwidth of a wide-band signal S11 obtained through the detection is limited by means of the narrow-band filter 83, whereby a narrow-band signal S12 is produced.

The level L1 of the narrow-band signal S12 is detected by a level detector circuit 28, and the received level L1 thus detected is sampled by a sampling circuit 29. The data D7 representing the sampled level is once stored in a temporary memory 30, and the difference between the stored level data D8 and the current received level data D7 is calculated in a difference calculator circuit 31.

The difference data D9 obtained as a result of such calculation is compared with the threshold value D10 by a comparator circuit 33 and, when the difference data D9 is greater than the threshold value D10, a pulse signal D11 is outputted from the comparator circuit 33. Then the pulse signal D11 is counted by a counter circuit 35 only during a preset time determined by a timer 34.

Finally the travel velocity data D14 corresponding to the count value D13 is retrieved and outputted from a converter circuit 36. The velocity detector circuit enclosed in a broken-line frame 84 in the travel velocity detecting apparatus 79 may be replaced with a velocity detector circuit 86 shown in FIG. 26.

The velocity detector circuit 84 detects the velocity by calculating the received level difference, whereas the velocity detector circuit 86 performs its operation by detecting the number of received level crossings.

Figure 26:
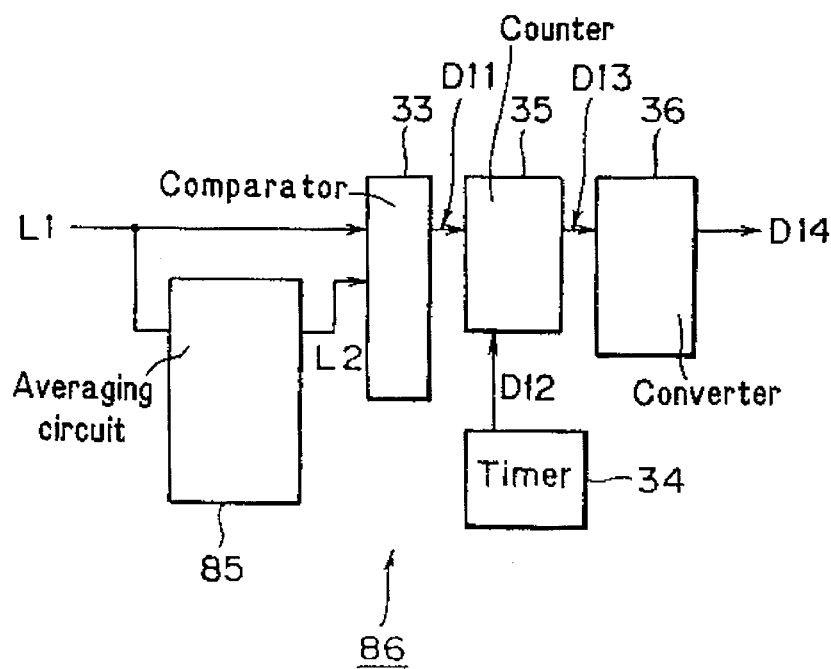
FIG. 26 is a block diagram of a velocity detector circuit employed in place of the velocity detector circuit enclosed in a broken-line frame 84 in the 17th embodiment of FIG. 24.

As shown in FIG. 26, the velocity detector circuit 86 comprises an averaging circuit 85, a comparator circuit 33, a timer 34, a counter circuit 35 and a converter circuit 36. It is defined here that the averaging circuit 85 is functionally similar to the aforementioned averaging circuit 49 shown in FIG. 15. And like component elements corresponding to those employed in the velocity detector circuit 84 of FIG. 24 are denoted by like reference numerals.

In the construction described above, the average value of the received level L1 detected by the level detector circuit 28 is calculated by the averaging circuit 85, and the result is outputted therefrom as an average level L2.

Thereafter the average level L2 and the received level L1 are compared with each other by the comparator circuit 33 and, when the received level L1 exceeds the average level L2, a pulse signal D11 is outputted from the comparator circuit 33. The pulse signal D11 is counted by the counter circuit 35 only during a preset time determined by the timer 34, and the travel velocity data D14 corresponding to the count value D13 is obtained in the converter circuit 36.

According to the 17th embodiment mentioned above, the travel velocity of a mobile station can be detected from a wide-band radio signal as well.

Next a travel velocity detecting apparatus 88 of an 18th embodiment will be described below with reference to FIG. 27. In the 18th embodiment of FIG. 27, like component circuits corresponding to those employed in the 17th embodiment of FIG. 24 are denoted by like reference numerals, and an explanation thereof is omitted here.

Figure 27:
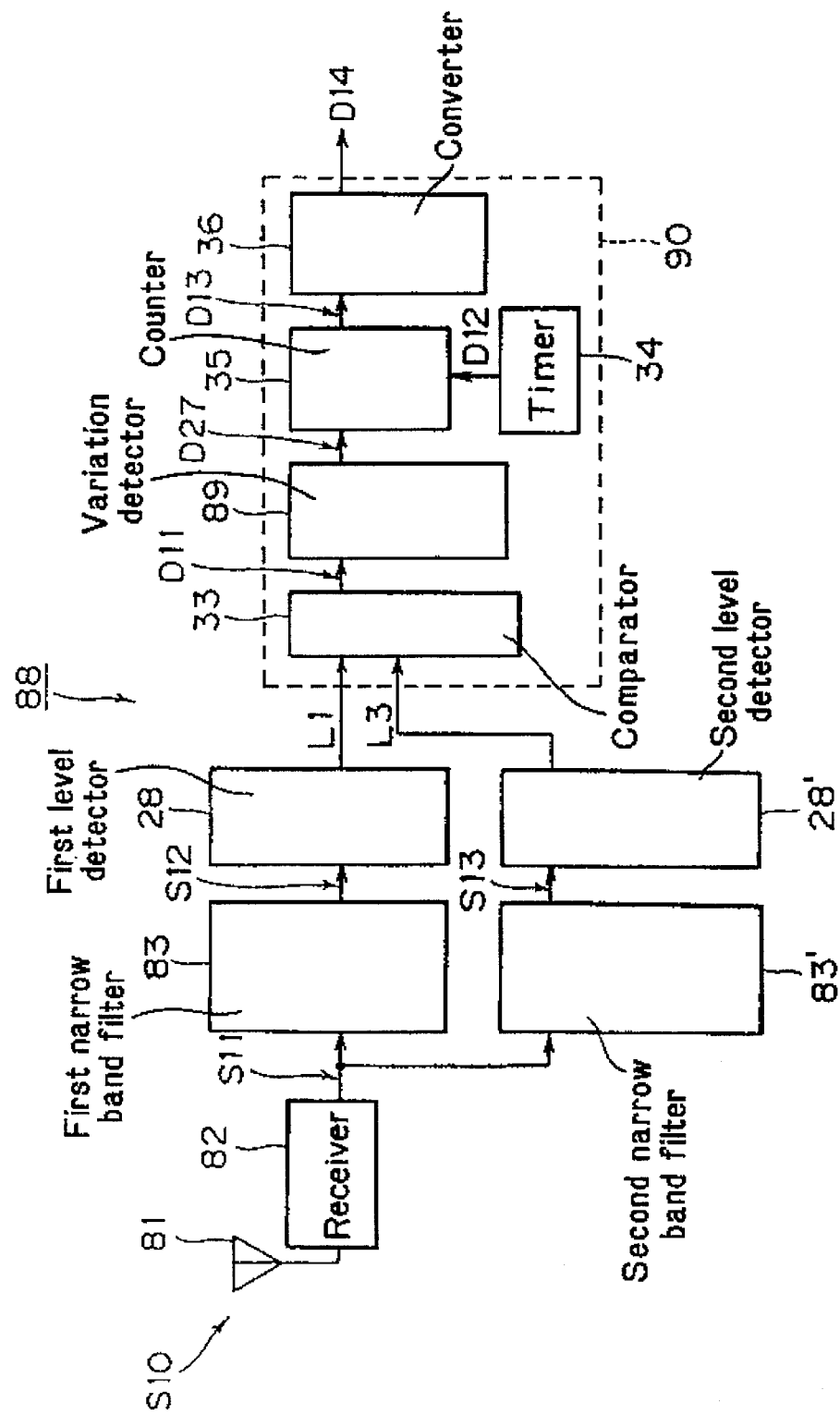
FIG. 27 is a block diagram of a travel velocity detecting apparatus in a mobile communication system according to an 18th embodiment of the invention.

The travel velocity detecting apparatus 88 shown in FIG. 27 is characterized in its construction including first and second narrow-band filters 83 and 83' whose center frequencies are spaced apart from each other by a predetermined bandwidth, wherein two narrow-band signals S12 and S13 can be obtained from a wide-band radio signal S10.

The reason for forming such a construction will now be explained with reference to FIG. 25. In the frequency selective fading, a frequency interval (correlation bandwidth $B_c$ shown in FIG. 25), where there occurs none of frequency correlation between level variations, i.e., correlation between level variations at different frequencies, is said to be 640 kHz in an 800 MHz band for example.

Therefore, when the transmission bandwidth $B_w$ is sufficiently wider than a frequency interval of 640 kHz, the circuit configuration may be so arranged that the respective center frequencies $_\Delta f$ of narrow-band filters are spaced apart from each other by a frequency interval greater than the correlation bandwidth Bc, whereby it is rendered possible to obtain a plurality of mutually independent received levels based on the Rayleigh fading.

According to the travel velocity detecting apparatus 88 shown in FIG. 27, a wide-band signal S11 obtained by detection in the receiver 82 is passed through the first and second narrow-band filters 83 and 83'.

Consequently, narrow-band signals S12 and S13 of mutually different bands are outputted from the first and second narrow-band filters 83 and 83' respectively.

The levels L1 and L3 of the narrow-band signals S12 and S13 are detected by first and second level detector circuits 28 and 28' respectively.

The two received levels L1 and L3 thus detected are compared with each other by a comparator circuit 33, and comparison data D11 of, e.g., "1" is outputted when the level L1 is higher. The comparison data is "0" when the level L3 is lower, or the preceding numerical value is outputted when the compared levels are equal to each other.

The comparison data D11 is inputted to a variation detector circuit 89 and, upon detection of a variation point, a pulse signal D27 is outputted therefrom. The pulse signal D27 is then counted by a counter circuit 35 during a preset time determined by a timer 34, and the travel velocity data D14 corresponding to the count value D13 is retrieved by and outputted from a converter circuit 36.

Also in the 18th embodiment explained above, it is possible to achieve the same effects as those in the aforementioned 17th embodiment.

Next a travel velocity detecting apparatus 92 of a 19th embodiment will be described below with reference to FIG. 28. In the 19th embodiment of FIG. 28, like component circuits corresponding to those in the foregoing 18th embodiment of FIG. 27 are denoted by like reference numerals, and an explanation thereof is omitted here.

Figure 28:
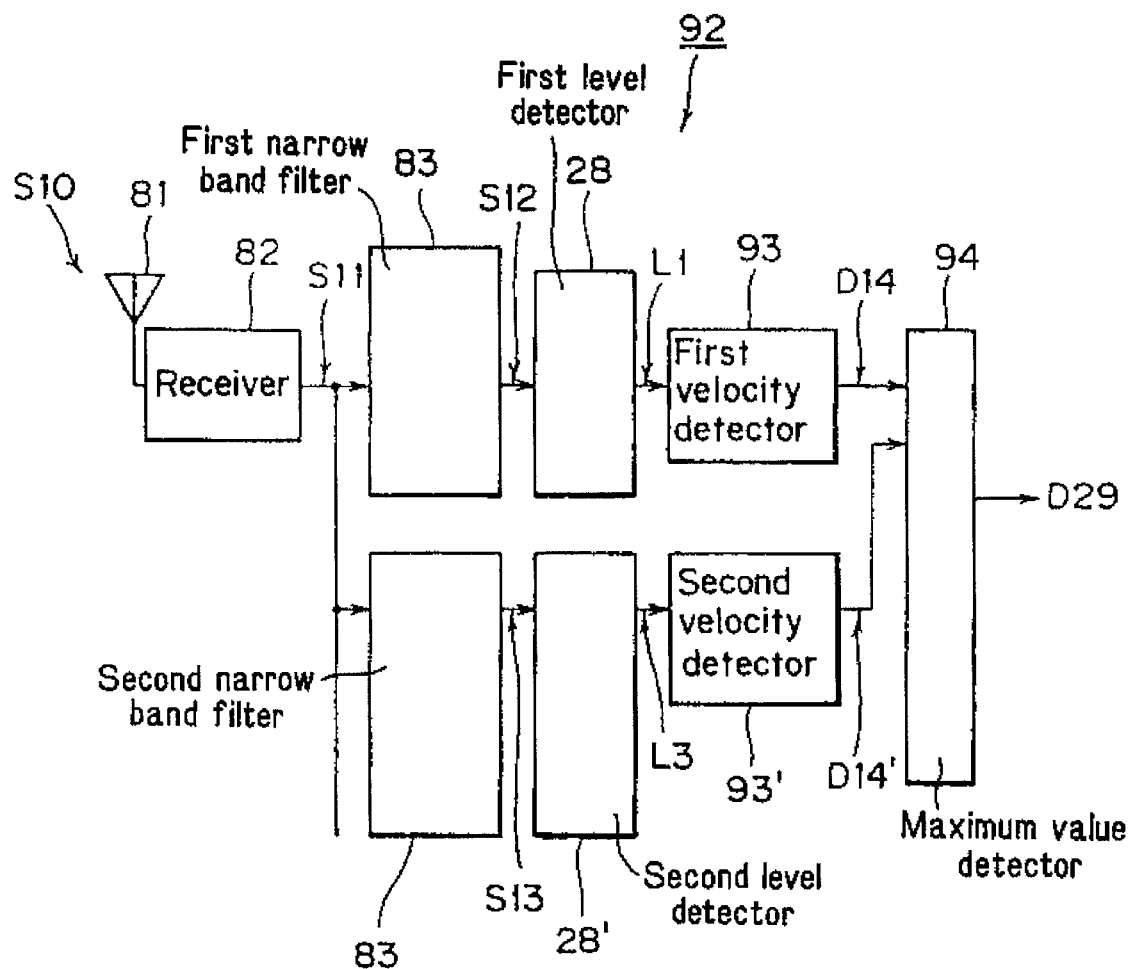
FIG. 28 is a block diagram of a travel velocity detecting apparatus in a mobile communication system according to a 19th embodiment of the invention.

The travel velocity detecting apparatus 92 shown in FIG. 28 is characterized in its construction where a plurality of narrow-band filters are included, and the maximum value out of travel velocity data obtained via a plurality of branches relative to such filters is detected and outputted. However, similarly to FIG. 27, only two branches relative to first and second narrow-band filters 83 and 83' are shown in FIG. 28. And velocity detector circuits 93 and 93' each for detecting the velocity in the individual branch are connected to stages posterior to first and second level detector circuits 28 and 28'.

Each of the velocity detector circuits 93 and 93' may be composed of the aforementioned velocity detector circuit 84 denoted by a broken-line frame in FIG. 24 or the velocity detector circuit 86 shown in FIG. 26.

According to the above construction, travel velocity data D14 and D14' are detected in the individual branches relative to the narrow-band filters 83 and 83' respectively, and the maximum value (e.g., D14) of the entire travel velocity data is detected by a maximum value detector circuit 94 and then is outputted therefrom as travel velocity data D29.

Thus, according to the 19th embodiment mentioned above, one travel velocity indicative of the maximum value can be detected out of a plurality of travel velocities detected from a plurality of frequency bands.

Next a travel velocity detecting apparatus 95 of a 20th embodiment will be described below with reference to FIG. 29. In the 20th embodiment of FIG. 29, like component circuits corresponding to those employed in the foregoing 19th embodiment of FIG. 28 are denoted by like reference numerals, and an explanation thereof is omitted here.

Figure 29:
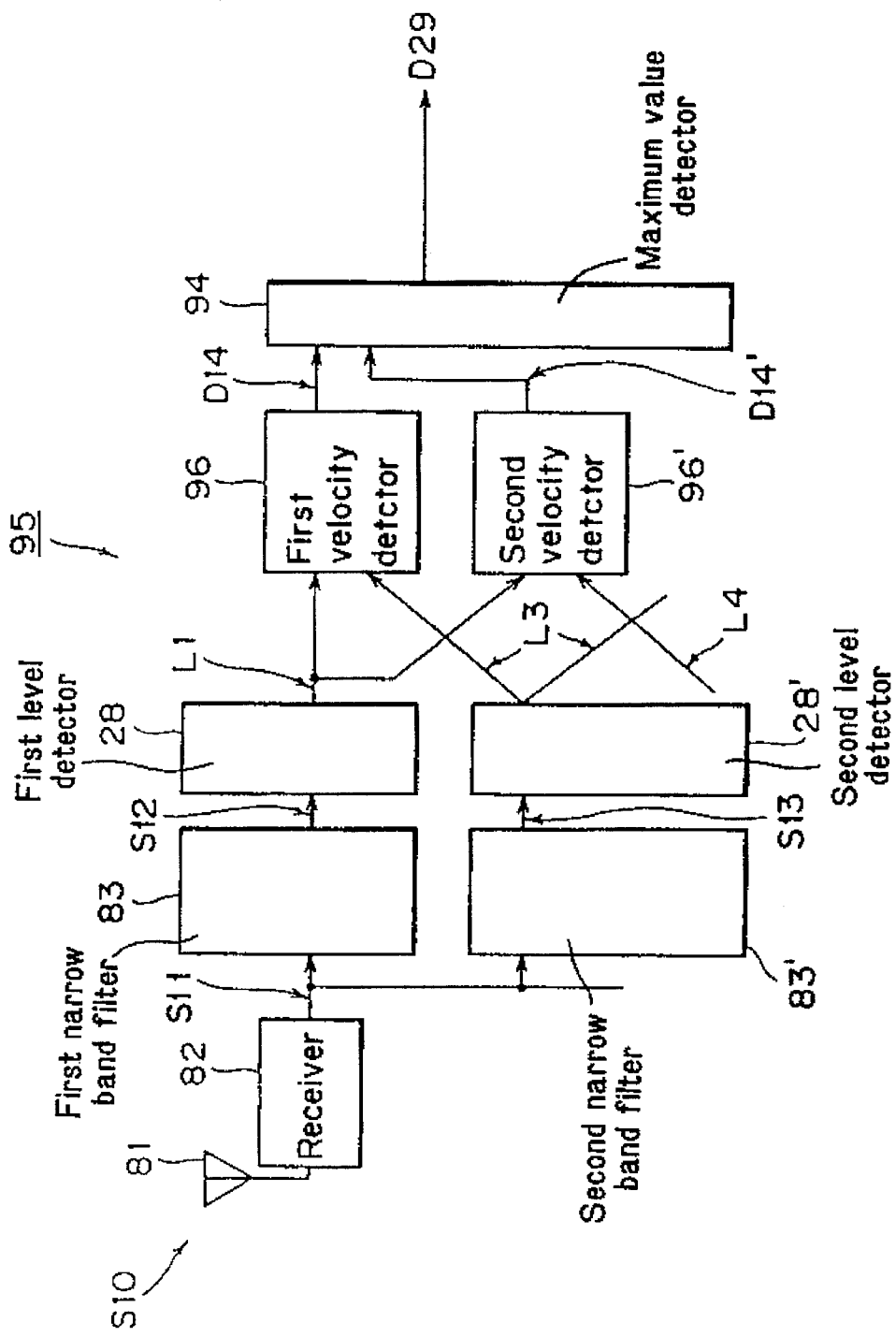
FIG. 29 is a block diagram of a travel velocity detecting apparatus in a mobile communication system according to a 20th embodiment of the invention.

In comparison with the 19th embodiment of FIG. 28, the travel velocity detecting apparatus 95 shown in FIG. 29 has a difference in the point that the aforementioned velocity detector circuit denoted by a broken-line frame 90 in FIG. 27 is applied to velocity detector circuits 96 and 96', and levels L1 and L3 detected by different level detector circuits 28 and 28' are inputted to a comparator circuit 33 which is included in the velocity detector circuit 90.

Also in the 20th embodiment of the construction mentioned above, it is possible to achieve the same effects as those in the foregoing 19th embodiment.

Next a travel velocity detecting apparatus 98 of a 21st embodiment will be described below with reference to FIG. 30. In the 21st embodiment of FIG. 30, like component circuits corresponding to those employed in the 17th embodiment of FIG. 24 are denoted by like reference numerals, and an explanation thereof is omitted here.

Figure 30:
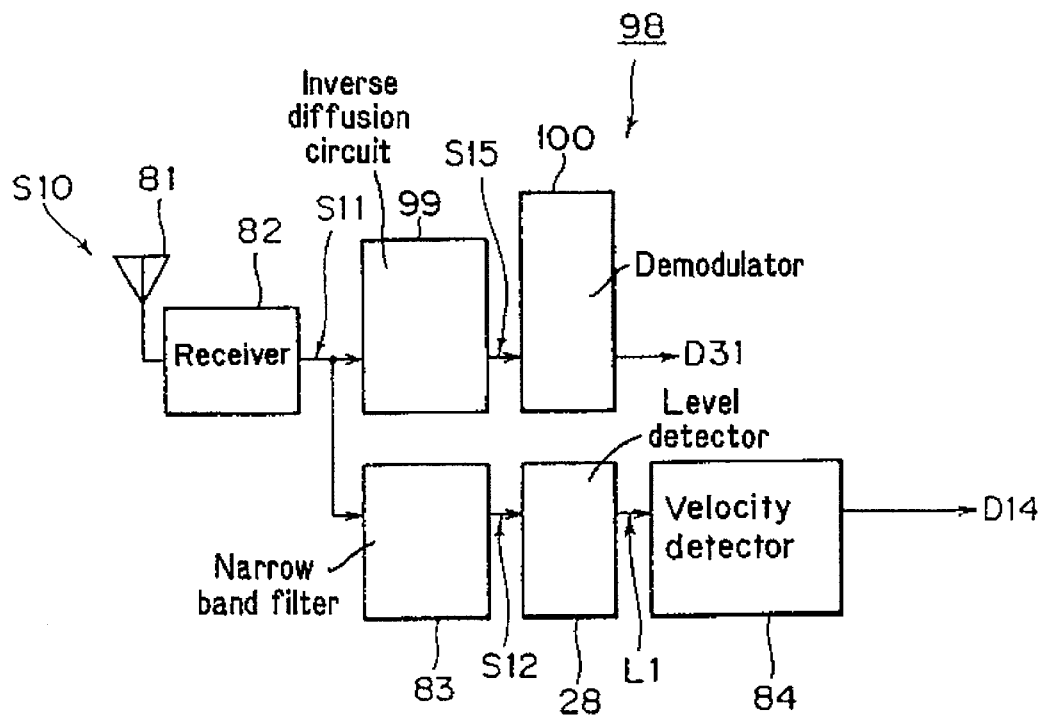
FIG. 30 is a block diagram of a travel velocity detecting apparatus in a mobile communication system according to a 21st embodiment of the invention.

The travel velocity detecting apparatus 98 shown in FIG. 30 is installed in a mobile station in a CDMA (code division multiple access) system and detects the travel velocity by receiving a wide-band radio signal S10 as in the aforementioned 17th embodiment.

Reference numeral 99 in FIG. 30 denotes an inverse diffusion circuit which multiplies the same code as the one superimposed by a diffusion circuit on the transmission side, thereby reproducing a transmitted signal S15.

Denoted by 100 is a demodulator circuit which converts the signal S15 into digital data D31. A velocity detector circuit 84 in FIG. 30 may be replaced with the aforementioned velocity detector circuit 86 shown in FIG. 26.

Since the travel velocity detecting apparatus 98 of the 21st embodiment represents an exemplary application to a CDMA system, it is impossible to detect the relative travel velocity to a base station, and therefore the apparatus 98 detects merely the travel velocity of the mobile station alone.

Next a travel velocity detecting apparatus 102 of a 22nd embodiment will be described below with reference to FIG. 31.

Figure 31:
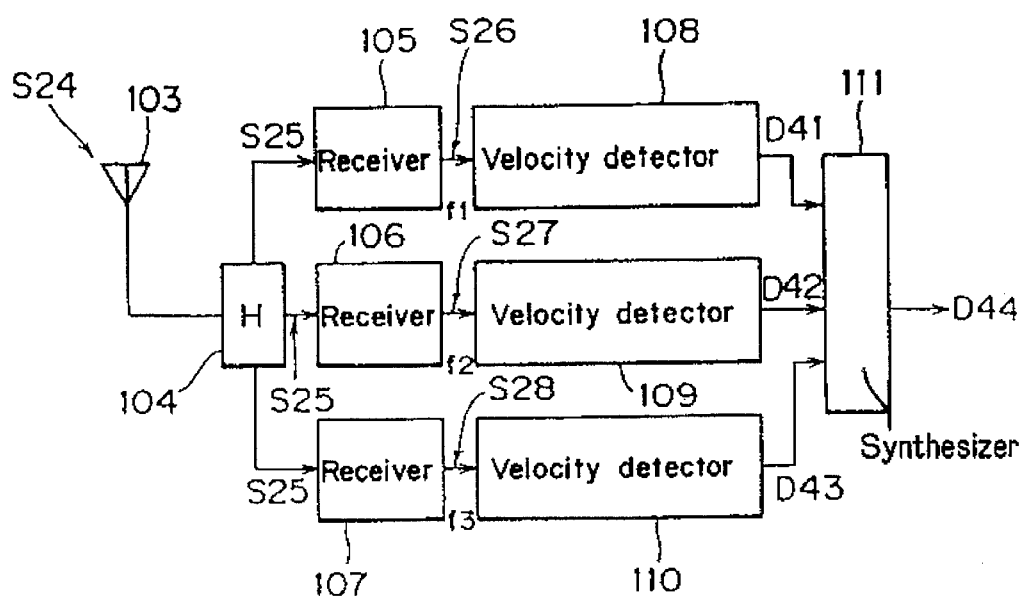
FIG. 31 is a block diagram of a travel velocity detecting apparatus in a mobile communication system according to a 22nd embodiment of the invention.

The travel velocity detecting apparatus 102 shown in FIG. 31 is installed in a mobile station and is capable of detecting the travel velocity thereof further precisely by first receiving radio waves of mutually different frequencies simultaneously from three base stations, then detecting the travel velocities on the basis of the individual received radio waves, and selecting the maximum value of the detected travel velocities.

An explanation will now be given with regard to the principle in an exemplary case of calculating the travel velocity v by detecting a quantity which is in a proportional or monotone increasing relation to the Doppler frequency $f_D$. Relative to an angle θ formed by the forward direction of the mobile station (travel velocity vector) and the incoming direction of power-wise dominant radio waves out of the entire received radio waves, a level-variation dominant component is expressed as $f_D$ cos θ, so that the estimated travel velocity is expressed as v cos θ. Since the angle θ changes every moment, it is usual to observe the angle θ for a long time or to observe a plurality of estimated travel velocities v cos θ where each θ is independent, hence realizing a further precise calculation of the travel velocity v by adopting the maximum value (cos θ≈1).

The travel velocity detecting apparatus 102 of FIG. 31 constituted on the basis of the above principle comprises an antenna 103, a hybrid circuit 104, receivers 105, 106 and 107, velocity detector circuits 108, 109 and 110, and a synthesizer circuit 111.

Figure 32:
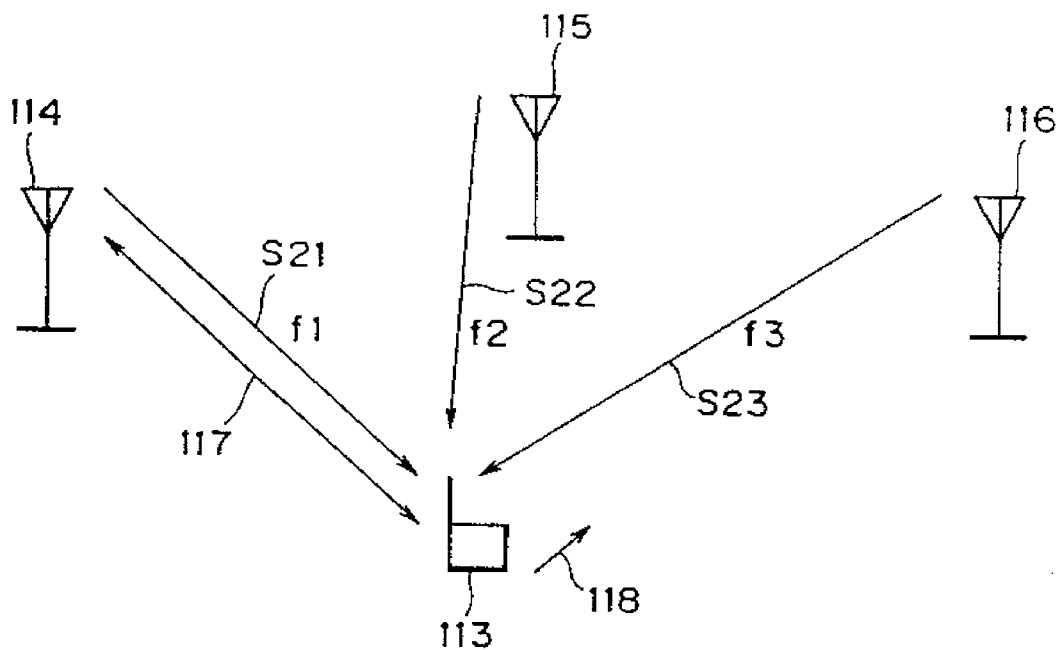
FIG. 32 schematically shows a mobile communication system with a plurality of base stations and mobile stations for explaining the 22nd embodiment of FIG. 31.

FIG. 32 shows a mobile station 113 where the travel velocity detecting apparatus 102 is installed, and also shows three base stations 114, 115 and 116 located at mutually different sites. It is supposed here that the mobile station 113 communicates with the base stations 114, 115 and 116 by the use of radio signals S21, S22 and S23 having mutually different frequencies f1, f2 and f3 respectively.

In this example, it is assumed now that the mobile station is communicating with the base station 114 as indicated by a bidirectional arrow line 117. And the travel velocity vector of the mobile station 113 is represented by an arrow line 118.

When the mobile station 113 detects its travel velocity, the travel velocity detecting apparatus 102 installed therein simultaneously receives three radio signals S21–S23 (hereinafter expressed collectively as S20) of three different frequencies f1–f3.

In the travel velocity detecting apparatus 102, the antenna 103 receives the three radio signals S24.

The received signals S24 are branched into three by the hybrid circuit 104. And the individual signals S25 thus branched are inputted to the receivers 105, 106 and 107 respectively.

The receiver 105 demodulates the signal S26 (component of radio signal S21) of the frequency f1 from the input signal S25; the receiver 106 demodulates the signal S27 (component of radio signal S22) of the frequency f2 from the input signal S25; and the receiver 107 demodulates the signal S28 (component of radio signal S23) of the frequency f3 from the input signal S25.

The signals S26, S27 and S28 thus obtained are inputted to the velocity detector circuits 108, 109 and 110 respectively.

In the velocity detector circuits 108–110, relative travel velocities D41, D42 and D43 to the base stations 114–116 are detected from the input signals S26–S28 and are outputted.

The internal circuit configuration of each of the velocity detector circuits 108–110 is the same as that of, e.g., FIG. 13 including from the level detector circuit 28 to the converter circuit 36.

The synthesizer circuit 111 shown in FIG. 31 selects the maximum value out of the three travel velocities D41–D43 inputted thereto and then outputs the selected maximum value as a travel velocity D44 finally obtained.

According to the travel velocity detecting apparatus 102 of the 22nd embodiment mentioned above, it is possible to attain a high precision in detecting the travel velocity of the mobile station.

Next a travel velocity detecting apparatus of a 23rd embodiment will be described below with reference to FIG. 33. In the 23rd embodiment of FIG. 33, like component circuits corresponding to those in FIG. 32 are denoted by like reference numerals, and an explanation thereof is omitted here.

In the 23rd embodiment, the velocity detector circuit 108 of the travel velocity detecting apparatus 102 shown in FIG. 31 is installed in each of base stations 114–116, and the synthesizer circuit 111 in FIG. 31 is installed in a network control station 119.

Figure 33:
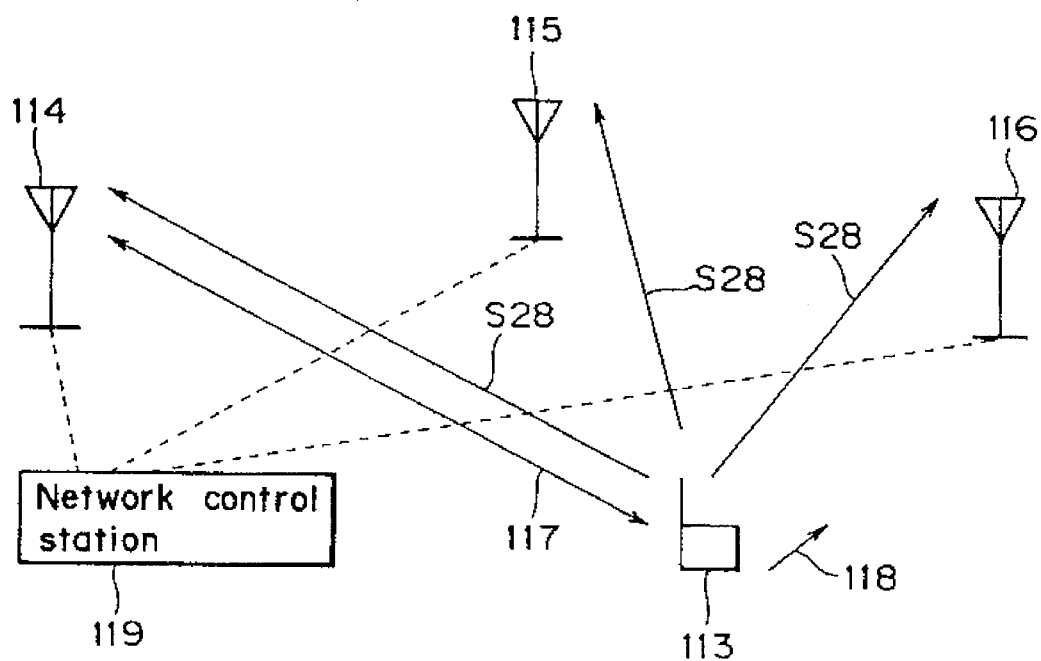
FIG. 33 schematically shows a mobile communication system with a plurality of base stations and mobile stations for explaining a 23rd embodiment of the invention.

The operation in FIG. 33 is performed in the following manner. In response to a command from the network control station 119, the base stations 115 and 116 not concerned in a communication receive a radio signal S28 outputted from a mobile station 113, then estimate the relative travel velocities D46 and D47 between the mobile station 113 and the relevant station (base station), and send such travel velocities D46 and D47 to the network control station 119.

The synthesizer circuit 111 in the network control station 119 selects a greater value out of the two input travel velocities D46 and D47, and then outputs the selected value as the travel velocity of the mobile station 113 finally obtained. The synthesizer circuit 111 may be installed in each of the base stations 114–116. In this case, however, it becomes necessary to transfer the travel velocities D46 and D47, which are estimated in the other base stations 115 and 116, via the network control station 119 or an unshown exchange to the relevant base station (114 in this example) concerned in the communication.

Also in the 23rd embodiment mentioned above, a high precision is attainable in detecting the travel velocity of the mobile station, as in the foregoing 22nd embodiment.

Next a travel velocity detecting apparatus 120 of a 24th embodiment will be described below with reference to FIG. 34.

Figure 34:
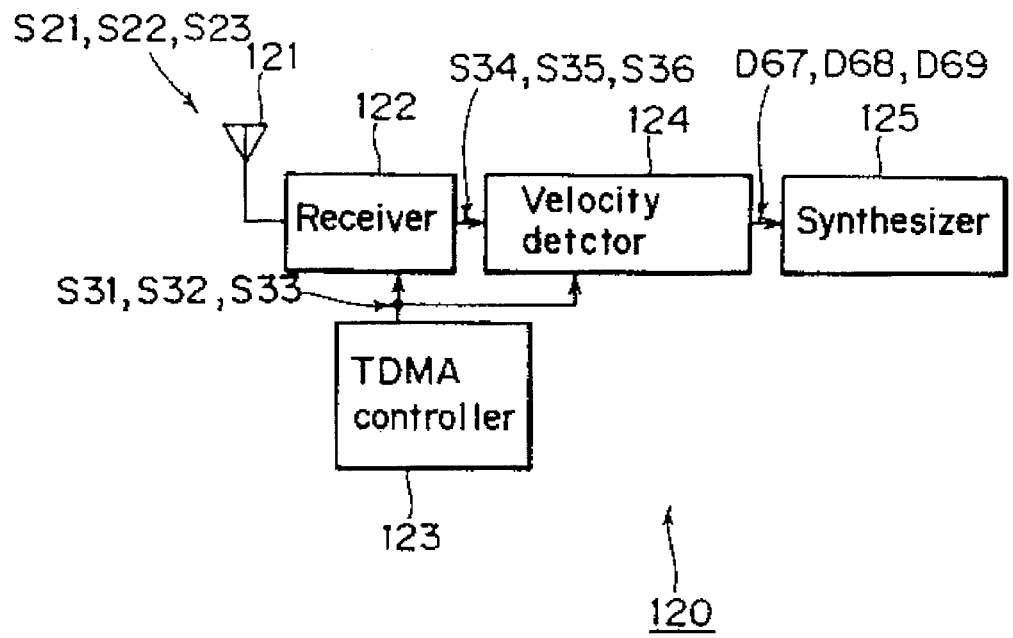
FIG. 34 is a block diagram of a travel velocity detecting apparatus in a mobile communication system according to a 24th embodiment of the invention.

The travel velocity detecting apparatus 120 shown in FIG. 34 is applicable to a TDMA (time division multiple access) mobile communication system. The system constitution relative to base stations and a mobile station is the same as that in FIG. 32.

Figure 35:
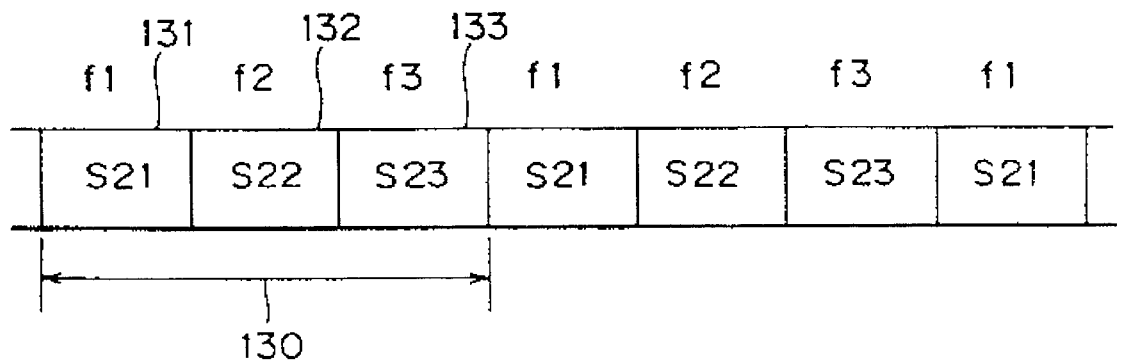
FIG. 35 shows a TDMA time slot of a signal received by a mobile station in the 24th embodiment of the invention.

In this system, as shown in FIG. 35, a TDMA frame 130 is multiplexed by time division in accordance with the number of first to third radio signals S21–S23 transmitted from base stations 114–116. In this example, the number of multiplexed signals is three. A mobile station 113 receives a signal S21 of a frequency f1 through a first time slot 131 in the frame 130, a signal S22 of a frequency f2 through a second time slot 132, and a signal S23 of a frequency f3 through a third time slot 133, respectively. And the travel velocity is calculated from each of the signals S21 to S23 received successively.

In FIG. 34, there are included an antenna 121, a receiver 122, a TDMA controller 123, a velocity detector circuit 124, and a synthesizer circuit 125.

The receiver 122 receives the radio signals S21–S23 successively under control of the TDMA controller 123 and demodulates the received signals. The TDMA controller 123 supplies first, second and third control signals S31, S32 and S33 to the receiver 122 for a fixed time period cyclically so as to enable the receiver 122 to receive the signals S21–S23 of the frequencies f1–f3 in succession. More specifically, the signal S21 is received during supply of the first control signal S31 to the receiver 122, and the signal S22 is received during supply of the second control signal S32 to the receiver 122, and the signal S23 is received during supply of the third control signal S33 to the receiver 122.

The velocity detector circuit 124 detects three travel velocities from first, second and third demodulated signals S34, S35 and S36 outputted successively from the receiver 122. It is defined here that the first, second and third demodulated signals S34, S35 and S36 are obtained by demodulating the first, second and third radio signals S21, S22 and S23, respectively.

Figure 36:
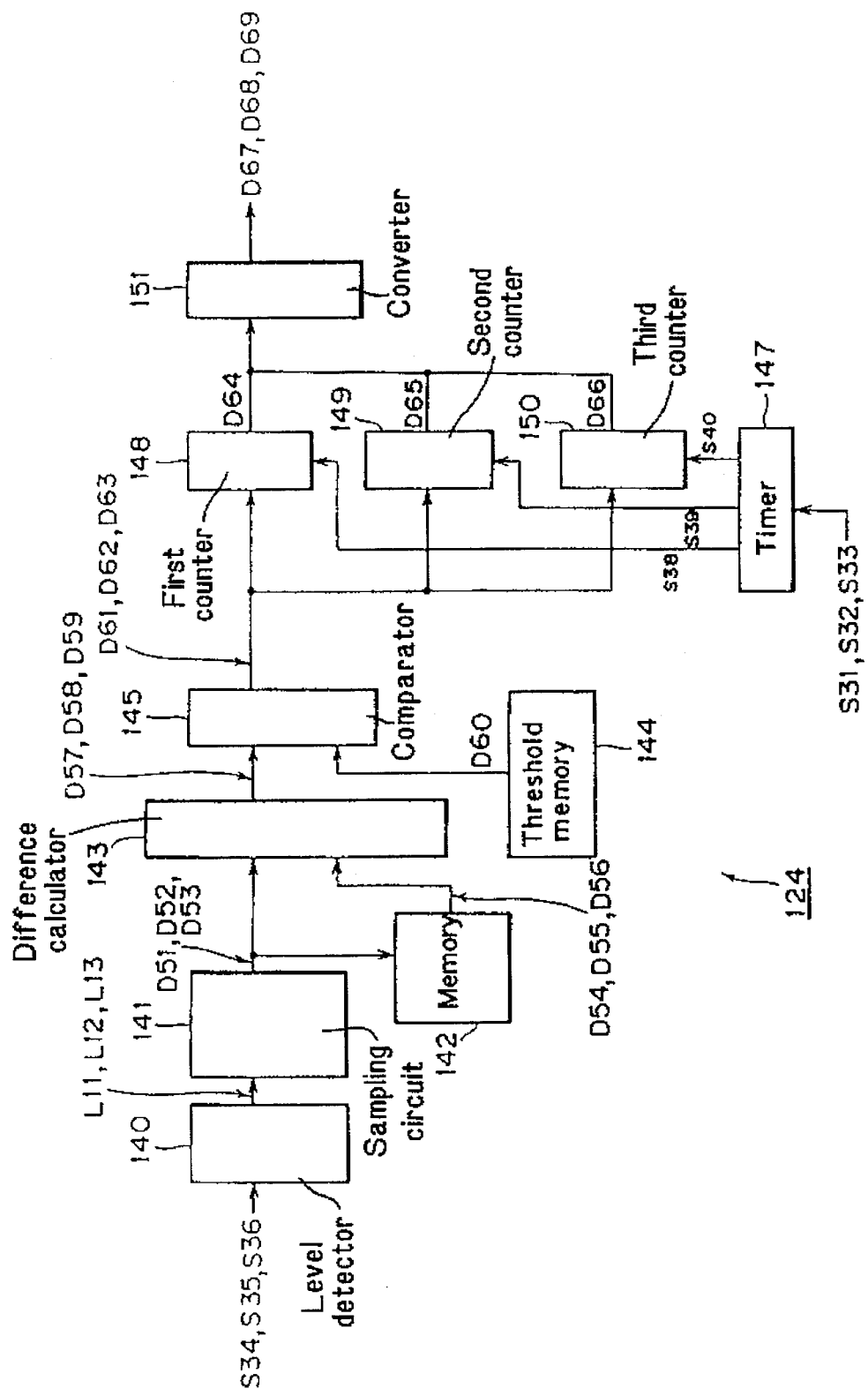
FIG. 36 is a block diagram showing an internal configuration of a velocity detector circuit 124 employed in the embodiment of FIG. 34.

The velocity detector circuit 124 will now be described in detail with reference to a block diagram of FIG. 36 which shows its internal configuration.

A level detector circuit 140 detects the levels of the first to third demodulated signals S34–S36. Then a sampling circuit 141 samples the first, second and third levels L11, L12 and L13, which are obtained from the level detector circuit 141, at a predetermined sampling frequency. The sampling circuit 141 is normally composed of an A-D converter. Due to the use of an A-D converter, the succeeding process can be digitally executed.

A temporary memory 142 successively stores first, second and third level data D51, D52 and D53 obtained from the sampling circuit 29 and then outputs such data in the order of the storage. The data once stored in the memory 142 and subsequently outputted therefrom are termed here first, second and third storage data D54, D55 and D56.

A difference calculator circuit 143 calculates the respective differences between the first to third storage data D54, D55, D56 and the first to third level data D51, D52, D53, and outputs first to third difference data D57, D58, D59 therefrom.

A threshold memory 144 stores a threshold value D60 of a predetermined level. A comparator circuit 145 compares each of the first to third difference data D57, D58, D59 with the threshold value D60, and when the difference data D57, D58, D59 exceed the threshold value D60, the comparator circuit 145 outputs first to third pulse signals D61, D62, D63 therefrom.

A timer 147 produces first to third enable signals S38, S39, S40, which place first to third counter circuits 148, 149, 150 in an operable state respectively, in response to supply of the first to third control signals S31, S32, S33 outputted from the TDMA controller 123.

More specifically, the first enable signal S38 is outputted from the timer 147 during supply of the first control signal S31, and the second enable signal S39 is outputted during supply of the second control signal S32, and the third enable signal S40 is outputted during supply of the third control signal S33.

First to third counter circuits 148, 149, 150 respectively count first to third pulse signals D61, D62, D63 only for a time during which the first to third enable signals S38, S39, S40 are supplied thereto. And upon completion of repeated supply of the first to third enable signals S38, S39, S40 a predetermined number of times, the counter circuits 148, 149, 150 output first to third count values D64, D65, D66 and then are reset. The counting operation is so performed as to count one per pulse of the input signals (D61, D62, D63).

The first enable signal S38 and the first pulse signal D61, both of which result from the first control signal S31, are supplied simultaneously to the first counter circuit 148. And such timing relation is the same with respect to the other signals as well.

More specifically, in response to the first enable signal S38 supplied to the first counter circuit 148, this circuit 148 counts the input first pulse signal D61 during the enable-signal supply time. Meanwhile in response to the second enable signal S39 supplied to the second counter circuit 149, this circuit 149 counts the input second pulse signal D62 during the enable-signal supply time. And in response to the third enable signal S40 to the third counter circuit 150, this circuit 150 counts the input third pulse signal D63 during the enable-signal supply time.

Supposing here that each counter circuit is so controlled as to be reset when an enable signal has been supplied thereto 10 times for example, the first counter circuit 148 is reset after outputting a first count value D64 upon completion of supply of the first enable signal S38 thereto. The same operation is performed with respect to the other counter circuits 149 and 150 as well.

A converter circuit 151 estimates the relative velocity between the relevant mobile station and the base station from each of the first to third count values D64–D66 and then outputs first to third travel velocity data D67, D68 and D69 which correspond respectively to the count values D64–D66. The travel velocity data D67, D68 and D69 are inputted successively to the synthesizer circuit 125 shown in FIG. 34.

The synthesizer circuit 125 once stores the travel velocity data D67, D68 and D69 in mutually different memory areas and, upon complete storage of the three data D67, D68 and D69, the circuit 125 selects the maximum value and then outputs the same as a travel velocity D70 finally obtained.

Also in the 24th embodiment described above, a high precision is attainable in detecting the travel velocity of the mobile station, as in the aforementioned 22nd embodiment.

INDUSTRIAL APPLICABILITY

According to the present invention, it is possible to detect the travel velocity, travel distance and acceleration of a mobile station from radio communication waves. And a received level can be detected adaptively to the travel velocity of the mobile station.

Consequently it becomes possible to perform, on the basis of the travel velocity, travel distance and acceleration thus detected, a variety of operations inclusive of hand-off control, transmission power control, radio network control such as radio channel allocation control, and service control as well.

We claim:

1. A travel velocity detecting apparatus in a mobile communication system comprising:

control means for outputting a plurality of control signals to perform time-division multiplex communication;

receiving means connected operatively to said control means for receiving, through time-division multiplex communication based on said control signals, radio waves of different frequencies transmitted from a plurality of base stations;

velocity detector means including:

level detector means connected operatively to both of said control means and said receiving means for detecting a level of a signal outputted from said receiving means;

sampling means connected operatively to said level detector means for sampling said signal level;

memory means connected operatively to said sampling means for storing a sampled level, outputting the same therefrom in an order of storage;

difference calculator means connected operatively to both of said memory means and said sampling means for calculating a difference between the received levels outputted respectively from said sampling means and said memory means;

comparator means connected operatively to said difference calculator means for comparing the difference, which is obtained in said difference calculator means, with a preset threshold value to thereby determine whether said difference is in excess of said threshold value;

a plurality of counter means connected operatively to said comparator means for counting, only during a supply of said plurality of control signals, comparison results outputted from said comparator means, thereby counting a number of times that said difference has exceeded said threshold value; and converter means connected operatively to said plurality of counter means for estimating relative travel velocities between a relevant mobile station and said plurality of base stations on the basis of count values obtained in said counter means; and means connected operatively to said velocity detector means for selecting a maximum value out of the relative travel velocities obtained in said velocity detector means, and delivering the selected maximum value as an output.

2. A travel velocity detecting apparatus in a mobile communication system comprising:

a plurality of diversity receiving means for detecting received radio waves to thereby obtain received data and detecting powers of said radio waves;

comparator means connected operatively to said plurality of receiving means for mutually comparing the powers detected by said receiving means so as to determine which of said powers is greater:

selector means connected operatively to said receiving means and said comparator means for selecting one of said received data in accordance with a comparison result outputted from said comparator means;

variation detector means connected operatively to said comparator means for detecting variations of said comparison result;

counter means connected operatively to said variation detector means for counting, only for a preset time, a number of the variations detected by said variation detector means; and converter means connected operatively to said counter means for calculating a relative travel velocity between a relevant mobile station and an opposite transmitting station on the basis of a count value obtained by said counting operation.

3. A travel velocity detecting apparatus in a mobile communication system comprising:

switching means for alternately switching a plurality of antennas of different branches and alternately outputting first and second radio waves received by said antennas of two branches;

field intensity detector means connected operatively to said switching means for detecting electric field intensities of said first and second radio waves;

memory means connected operatively to said field intensity detector means for storing the field intensity of said first radio waves and outputting said field intensity therefrom in the order of storage;

comparator means connected operatively to said field intensity detector means and said memory means, for comparing the field intensity of the second radio waves with the field intensity of the first radio waves outputted from said memory means, thereby determining which of said field intensities is greater;

variation detector means connected operatively to said comparator means for detecting variations of a comparison result outputted from said comparator means;

counter means connected operatively to said variation detector means for counting, only for a preset time, a number of the variations detected by said variation detector means; and converter means connected operatively to said counter means for calculating a relative travel velocity between a relevant mobile station and an opposite transmitting station on the basis of a count value obtained by said counting operation.

4. A travel velocity detecting apparatus in a mobile communication system comprising:

a plurality of receiving means for receiving radio waves and detecting powers of said radio waves;

comparator means connected operatively to said plurality of receiving means for mutually comparing the powers detected by said receiving means so as to determine which of said powers is greater;

variation detector means connected Operatively to said comparator means for detecting variations of a comparison result outputted from said comparator means;

counter means connected operatively to said variation detector means for counting, only for a preset time, a number of the variations detected by said variation detector means;

converter means connected operatively to said counter means for calculating a relative travel velocity between a relevant mobile station and an opposite transmitting station on the basis of a count value obtained by said counting operation; and corrector means operatively connected in a posterior stage to one of said receiving means for correcting any gain difference existing between said plurality of receiving means.

5. A travel velocity detecting apparatus in a mobile communication system comprising:

a plurality of receiving means for receiving radio waves and detecting powers of said radio waves;

comparator means connected operatively to said plurality of receiving means for mutually comparing the powers detected by said receiving means so as to determine which of said powers is greater;

variation detector means connected operatively to said comparator means for detecting variations of a comparison result outputted from said comparator means;

counter means connected operatively to said variation detector means for counting, only for a preset time, a number of the variations detected by said variation detector means; and converter means connected operatively to said counter means for calculating a relative travel velocity between a relevant mobile station and an opposite transmitting station on the basis of a count value obtained by said counting operation; wherein said converter means includes:

a table composed of integral number data of "0, 1, 2, . . . , N" and travel velocity data assigned correspondingly to said integral number data, and means for retrieving, in response to input of said count value to said converter means, the travel velocity data assigned correspondingly to the integral number data corresponding to said count value, and then outputting a retrieved travel velocity data as said relative travel velocity.

6. A travel velocity detecting apparatus in a mobile communication system comprising:

a plurality of receiving means for receiving radio waves and detecting powers of said radio waves;

comparator means connected operatively to said plurality of receiving means for mutually comparing the powers detected by said receiving means so as to determine which of said powers is greater;

variation detector means connected operatively to said comparator means for detecting variations of a comparison result outputted from said comparator means;

counter means connected operatively to said variation detector means for counting, only for a preset time, a number of the variations detected by said variation detector means; and converter means connected operatively to said counter means for calculating a relative travel velocity between a relevant mobile station and an opposite transmitting station on the basis of a count value obtained by said counting operation; wherein said converter means includes means to perform such operations that a conversion equation $v=(N_{BC}/C)\times\lambda$ for calculating the travel velocity v is programmed, in which $N_{BC}$ denotes said number of variations, $\lambda$ denotes a wavelength of said radio waves, and C is a constant, said travel velocity v is calculated by substituting said count value for $N_{BC}$ in the programmed conversion equation, and the travel velocity v thus obtained is outputted as said relative travel velocity.

7. A travel velocity detecting apparatus in a mobile communication system comprising:

a plurality of receiving means for receiving radio waves and detecting powers of said radio waves;

comparator means connected operatively to said plurality of receiving means for mutually comparing the powers detected by said receiving means so as to determine which of said powers is greater;

variation detector means connected operatively to said comparator means for detecting variations of a comparison result outputted from said comparator means;

counter means connected operatively to said variation detector means for counting, only for a preset time, a number of the variations detected by said variation detector means; and converter means connected operatively to said counter means for calculating a relative travel velocity between a relevant mobile station and an opposite transmitting station on the basis of a count value obtained by said counting operation; wherein said converter means includes:

a plurality of tables equal in number to kinds of wavelengths of received radio waves, and means for detecting the wavelengths, each of said tables being composed of integral number data of "0, 1, 2, . . . , N" and travel velocity data assigned correspondingly to said integral number data;

wherein the table corresponding to the wavelength detected by said means is retrieved, and the travel velocity data assigned correspondingly to the integral number data corresponding to said count value is retrieved from said table to thereby detect said relative travel velocity.

8. A travel velocity detecting apparatus in a mobile communication system comprising:

a plurality of receiving means for receiving radio waves and detecting powers of said radio waves;

comparator means connected operatively to said plurality of receiving means for mutually comparing the powers detected by said receiving means so as to determine which of said powers is greater;

variation detector means connected operatively to said comparator means for detecting variations of a comparison result outputted from said comparator means;

counter means connected operatively to said variation detector means for counting, only for a preset time, a number of the variations detected by said variation detector means;

converter means connected operatively to said counter means for calculating a relative travel velocity between a relevant mobile station and an opposite transmitting station on the basis of a count value obtained by said counting operation; and wavelength detector means for detecting wavelengths of the radio waves;

wherein said converter means includes means to perform such operations that a conversion equation $v=(N_{BC}/C)\times\lambda$ for calculating the travel velocity v is programmed, in which $N_{BC}$ denotes said number of variations, $\lambda$ denotes the wavelength of said radio waves, and C is a constant, then said travel velocity v is calculated by substituting the wavelength, which is detected in said wavelength detector means, for $\lambda$ in the programmed conversion equation, and further by substituting said count value for $N_{BC}$ in said equation, and the travel velocity v thus obtained is outputted as said relative travel velocity.

9. A travel velocity detecting apparatus in a mobile communication system comprising:

a plurality of receiving means for receiving radio waves and detecting powers of said radio waves;

comparator means connected operatively to said plurality of receiving means for mutually comparing the powers detected by said receiving means so as to determine which of said powers is greater;

variation detector means connected operatively to said comparator means for detecting variations of a comparison result outputted from said comparator means;

counter means connected operatively to said variation detector means for counting, only for a preset time, a number of the variations detected by said variation detector means; and converter means connected operatively to said counter means for calculating a relative travel velocity between a relevant mobile station and an opposite transmitting station on the basis of a count value obtained by said counting operation;

maximum value detector means for detecting a maximum value of said relative travel velocity and outputting the detected maximum value as a relative travel velocity.

10. A travel velocity detecting apparatus in a mobile communication system comprising:

level detector means for detecting a received level of radio waves;

sampling means connected operatively to said level detector means for sampling said received level;

memory means connected operatively to said sampling means for storing a sampled level and outputting the same therefrom in an order of storage;

difference calculator means connected operatively to said memory means and said sampling means, for calculating a difference between the received levels outputted from said sampling means and said memory means;

comparator means connected operatively to said difference calculator means for comparing the difference, which is obtained from said difference calculator means, with a predetermined threshold value to make a decision as to whether the difference is in excess of the threshold value;

counter means connected operatively to said comparator means for counting, for a preset time, a comparison results outputted from said comparator means, thereby obtaining a number of times that said difference has exceeded said threshold value; and converter means connected operatively to said counter means for estimating a relative travel velocity between a relevant mobile station and an opposite transmitting station on the basis of a count value obtained in said counter means.

11. The travel velocity detecting apparatus in a mobile communication system according to claim 10, further comprising maximum value detector means for detecting a maximum value of said relative travel velocity and outputting the detected maximum value as a relative travel velocity.

12. A received power level measuring apparatus in a mobile station comprising:

a plurality of receiving means for detecting received levels of radio waves;

comparator means connected operatively to said plurality of receiving means for mutually comparing the received levels detected in said receiving means, thereby determining which of said received levels is higher;

variation detector means connected operatively to said comparator means for detecting a variation of a comparison result outputted from said comparator means;

counter means connected operatively to said variation detector means for counting, up to a preset value, a number of the variations detected by said variation detector means; and averaging means connected operatively to said counter means and one of said receiving means, for temporally averaging one of said received levels until a count value obtained in said counter means reaches a preset value, and outputting an average value thus obtained as a received level.

13. A received power level measuring apparatus in a mobile station comprising:

a plurality of diversity receiving means for demodulating received radio waves to obtain received data and detecting the received levels of said radio waves;

comparator means connected operatively to said plurality of receiving means for mutually comparing the received levels detected in said receiving means, thereby determining which of said received levels is higher;

selector means connected operatively to said plurality of receiving means and said comparator means, for selecting one of said received data in accordance with a comparison result outputted from said comparator means;

variation detector means connected operatively to said comparator means for detecting a variation of said comparison result;

counter means connected operatively to said variation detector means for counting, up to a preset value, a number of the variations detected by said variation detector means; and averaging means connected operatively to said counter means, for temporally averaging one of said received levels until a count value obtained in said counter means reaches a preset value, and outputting an average value thus obtained as a received level.

14. A received power level measuring apparatus in a mobile station comprising:

switching means for alternately switching a plurality of antennas of different branches and alternately outputting first and second radio waves received by said antennas;

field intensity detector means connected operatively to said switching means for detecting electric field intensities of said first and second radio waves;

memory means connected operatively to said field intensity detector means for storing the field intensity of said first radio waves and outputting said field intensity therefrom in an order of storage;

comparator means connected operatively to said field intensity detector means and said memory means, for comparing the field intensity of the second radio waves with the field intensity of the first radio waves outputted from said memory means, thereby determining which of said field intensities is greater;

variation detector means connected operatively to said comparator means for detecting the variations of a comparison result outputted from said comparator means;

counter means connected operatively to said variation detector means for counting, only for a preset time, a number of the variations detected by said variation detector means; and averaging means for temporally averaging one of said field intensities until a count value obtained in said counter means reaches a preset value, and outputting an average value thus obtained as a received level.

15. The received power level measuring apparatus in a mobile station according to claim 12, further comprising;

corrector means connected operatively to a stage, posterior to one of said plurality of receiving means, for correcting any gain difference existing between said receiving means.

16. The received power level measuring apparatus in a mobile station according to claim 12, further comprising;

selector means connected operatively to stages posterior to said plurality of receiving means for, in accordance with the comparison result outputted from said comparator means, selecting a higher one of the received levels obtained in said receiving means, wherein a received level selected by said selector means is inputted to said averaging means.

17. The received power level measuring apparatus in a mobile station according to claim 12, wherein said variation detector means and said averaging means are connected to each other in such a manner that the number of the variations is inputted to said averaging means, and when said number remains unchanged for a predetermined time, the sample values of said received levels are partially excluded from the averaging calculation executed by said variation detector means.

18. The received power level measuring apparatus in a mobile station according to claim 12, further comprising:

frequency counter means for counting a frequency of sampling said received levels;

calculator means connected operatively to said frequency counter means for changing a frequency count value, which is obtained in said frequency counter means, to a fixed value so that the count value obtained in said counter means may become slightly smaller than a half of said frequency count value;

count value comparator means connected operatively to said counter means and said calculator means, for delivering an output which represents a difference between the count value and the frequency count value; and oscillator means connected operatively to said count value comparator means for controlling said sampling frequency in accordance with the difference obtained in said count value comparator means.

19. The travel velocity detecting apparatus in a mobile communication system according to claim 10, further comprising:

receiving means connected operatively to a stage anterior to said level detector means for receiving wide-band radio waves and demodulating the received radio waves; and a narrowband filter connected operatively to said receiving means for limiting the frequency bandwidth of a signal demodulated by said receiving means;

wherein said level detector means detects a level of a signal outputted from said narrow-band filter.

20. A travel velocity detecting apparatus in a mobile communication system comprising:

receiving means for receiving and demodulating wideband radio waves;

a plurality of narrow-band filters connected operatively to said receiving means for limiting a frequency bandwidth of a signal demodulated by said receiving means, said filters being such that the center frequencies thereof are so spaced apart from each other as to cause no correlation between level variations obtained;

a plurality of level detector means connected operatively to said plurality of narrow-band filters respectively for detecting levels of signals outputted from said narrow-band filters respectively;

comparator means connected operatively to said plurality of level detectors for mutually comparing the levels detected in said level detector means, thereby determining which of said levels is higher;

variation detector means connected operatively to said comparator means for detecting a variation of a comparison result outputted from said comparator means;

counter means connected operatively to said variation detector means for counting, only for a preset time, a number of variations detected by said variation detector means; and converter means connected operatively to said counter means for estimating a relative travel velocity between a relevant mobile station and an opposite transmitting station on the basis of a count value obtained by said counting operation.

21. A travel velocity detecting apparatus in a mobile communication system comprising:

receiving means for receiving and demodulating wideband radio waves;

a plurality of narrow-band filters connected operatively to said receiving means for limiting a frequency bandwidth of a signal demodulated by said receiving means;

level detector means connected operatively to said narrow-band filters for detecting a level of a signal outputted from each of said narrow-band filters;

a plurality of velocity detecting units connected in parallel to said receiving means, each unit including:

velocity detector means which has sampling means connected operatively to said level detector means for sampling a level detected by said level detector means, memory means connected operatively to said sampling means for storing a sampled level and outputting the same therefrom in an order of storage, difference calculator means connected operatively to both of said memory means and said sampling means for calculating a difference between the received levels outputted from said sampling means and said memory means, comparator means connected operatively to said difference calculator means for comparing the difference, which is obtained in said difference calculator means, with a preset threshold value to thereby determine whether said difference is in excess of said threshold value, counter means connected operatively to said comparator means for counting, for a preset time, comparison results outputted from said comparator means, thereby counting a number of times that said difference has exceeded said threshold value, and converter means connected operatively to said counter means for estimating a relative travel velocity between a relevant mobile station and an opposite transmitting station on the basis of a count value obtained in said counter means; wherein the center frequencies of said narrow-band filters are so spaced apart from each other as to cause no correlation between the level variations of the passed signals; and maximum value detector means connected operatively to said plurality of velocity detecting units for detecting a maximum value out of relative travel velocities outputted from said velocity detecting units.

22. The travel velocity detecting apparatus in a mobile communication system according to claim 19, wherein said apparatus is applied to a mobile station in a CDMA (code division multiple access) system.

23. A travel velocity detecting apparatus in a mobile communication system comprising:

branch means for simultaneously receiving radio waves of different frequencies transmitted from a plurality of base stations and branching a received radio wave signal group into a plurality of signals;

a plurality of receiving means connected operatively to signal output terminals of said branch means for demodulating signals of the different frequencies respectively from a plurality of signal groups outputted from said branch means;

a plurality of velocity detector means connected operatively to said plurality of receiving means respectively, each of said velocity detector means having:

level detector means for detecting a level of a signal outputted from said receiving means;

sampling means connected operatively to said level detector means for sampling the level detected by said level detector means;

memory means connected operatively to said sampling means for storing a sampled level and outputting the same therefrom in an order of storage;

difference calculator means connected operatively to both of said memory means and said sampling means for calculating a difference between received levels outputted from said sampling means and said memory means;

comparator means connected operatively to said difference calculator means for comparing the difference, which is obtained in said difference calculator means, with a preset threshold value to thereby determine whether the difference is in excess of the threshold value;

counter means connected operatively to said comparator means for counting, for a preset time, comparison results outputted from said comparator means, thereby counting a number of times that said difference has exceeded said threshold value; and converter means connected operatively to said counter means for estimating a relative travel velocity between a relevant mobile station and an opposite transmitting station on the basis of a count value obtained in said counter means; and synthesizer means connected operatively to said plurality of velocity detector means for selecting a maximum value out of the relative travel velocities obtained in said velocity detector means, and delivering a selected maximum value as an output.

24. The travel velocity detecting apparatus in a mobile communication system according to claim 23, wherein:

said velocity detector means is installed in each of said base stations, and said synthesizer means is installed in a network control station which serves to control said base stations; and when radio waves transmitted from one mobile station are received by said plurality of base stations, a relative travel velocity between a relevant station and said mobile station is detected from the received radio waves by each of the velocity detector means installed in said base stations and then is transmitted to the synthesizer means in said network control station, and subsequently said synthesizer circuit selects a maximum value out of the plural relative travel velocities received and delivers a selected maximum value as an output.

* * * * *

UNITED STATES PATENT AND TRADEMARK OFFICE
CERTIFICATE OF CORRECTION

PATENT NO. : 5,585,805
DATED : December 17, 1996
INVENTOR(S) : Tetsuyoshi TAKENAKA, et al.

It is certified that error appears in the above-indentified patent and that said Letters Patent is hereby corrected as shown below:

Column 7

Line 57,

"$P_1 = \int_0^\infty p(R)\,dR \int_{R/T}^\infty p(R')\,dR'$"

should be

--$P_1 = \int_0^\infty p(R)\,dR \int_{R/T}^\infty p(R')\,dR'$--;

Line 60,

"$P_2 = \int_0^\infty p(R)\,dR \int_{-R/T}^{-R/2T} p(R')\,dR'$"

should be

--$P_2 = \int_0^\infty p(R)\,dR \int_{-R/T}^{-R/2T} p(R')\,dR'$--.

UNITED STATES PATENT AND TRADEMARK OFFICE
CERTIFICATE OF CORRECTION

PATENT NO. : 5,585,805
DATED : December 17, 1996
INVENTOR(S) : Tetsuyoshi TAKENAKA, et al.

It is certified that error appears in the above-indentified patent and that said Letters Patent is hereby corrected as shown below:

<u>Column 18</u>

Line 49,

"$1(t) = \int_0^t v(t')dt'$";

should be

--$1(t) = \int_0^t v(t') dt'$--.

<u>Column 28</u>

Line 3, "Operatively" should be --operatively--.

Signed and Sealed this

Eleventh Day of March, 1997

BRUCE LEHMAN

*Attest:*

*Attesting Officer*  Commissioner of Patents and Trademarks

UNITED STATES PATENT AND TRADEMARK OFFICE
CERTIFICATE OF CORRECTION

PATENT NO. : 5,585,802
DATED : Dec. 17, 1996
INVENTOR(S) : Cabler et al

It is certified that error appears in the above-indentified patent and that said Letters Patent is hereby corrected as shown below:

At Col. 1/Line 10, delete "referenced" and insert therefore -- reference --.

At Col. 10/Line 26, delete "oscillator" and insert therefore -- oscillators --.

At Col. 15/Line 60, delete "by a writing" and insert therefore -- by writing --.

At Col. 15/Line 63, delete "by a writing" and insert therefore -- by writing --.

At Col. 16/Line 43, delete "to the both" and insert therefore -- to both --.

At Col. 16/Line 63, delete "normally this" and insert therefore -- normally. This --.

At Col. 17/Line 7, delete "oscillator" and insert therefore -- oscillators --.

At Col. 18/Line 42, delete "607 is" and insert therefore -- 607 are --.

At Col. 19/Line 24, delete "turn is used" and insert therefore -- turn used --.

At Col. 22/Line 20, between "illustrated" and "Table", insert there between -- in --.

At Col. 28/Line 38, delete "are" and insert therefore -- is --.

UNITED STATES PATENT AND TRADEMARK OFFICE
CERTIFICATE OF CORRECTION

PATENT NO.  : 5,585,802
DATED       : Dec. 17, 1996
INVENTOR(S) : Cabler et al

It is certified that error appears in the above-indentified patent and that said Letters Patent is hereby corrected as shown below:

At Col. 45/Line 45, between "associated" and "the" insert therebetween -- with --.

Signed and Sealed this

Twelfth Day of August, 1997

*Attest:*

BRUCE LEHMAN

*Attesting Officer*     *Commissioner of Patents and Trademarks*